(12) United States Patent
Zhao et al.

(10) Patent No.: US 12,508,348 B2
(45) Date of Patent: Dec. 30, 2025

(54) SCAFFOLD COMPRISING SURFACE HYPERBOLOID STRUCTURE, METHODS FOR FABRICATION AND USE THEREOF

(71) Applicant: THE HONG KONG POLYTECHNIC UNIVERSITY, Hong Kong (CN)

(72) Inventors: Xin Zhao, Hong Kong (CN); Yuhe Yang, Hong Kong (CN); Tianpeng Xu, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 0 days.

(21) Appl. No.: 17/822,168

(22) Filed: Sep. 30, 2022

(65) Prior Publication Data

US 2023/0067449 A1    Mar. 2, 2023

(51) Int. Cl.
*A61L 27/56* (2006.01)
*A61L 27/06* (2006.01)
*A61L 27/12* (2006.01)
*C12N 5/00* (2006.01)

(52) U.S. Cl.
CPC ............... *A61L 27/56* (2013.01); *A61L 27/06* (2013.01); *A61L 27/12* (2013.01); *C12N 5/0062* (2013.01); *A61L 2400/18* (2013.01)

(58) Field of Classification Search
None
See application file for complete search history.

(56) References Cited

U.S. PATENT DOCUMENTS

2017/0354513 A1\* 12/2017 Maglaras .............. A61F 2/4455
2019/0192303 A1\* 6/2019 Gallagher ............... A61P 19/08
2022/0072204 A1\* 3/2022 Lynch ..................... A61L 27/12

OTHER PUBLICATIONS

Li, X., et al., Bio-Design and Manufacturing 3: 15 â 29 (2020). (Year: 2020).\*
Vijayavenkataraman, S., et al., Materials and Design 191: 108602 (2020). (Year: 2020).\*
Melchels, F., et al., "Effects of the architecture of tissue engineering scaffolds on cell seeding and culturing," Acta Biomaterialia 6: 4208-4217 (2010). (Year: 2010).\*

\* cited by examiner

*Primary Examiner* — David J Blanchard
*Assistant Examiner* — Daniel F Coughlin
(74) *Attorney, Agent, or Firm* — S&F/WEHRW

(57) ABSTRACT

Provided herein are a scaffold having a surface hyperboloid structure and its fabrication method and application. The scaffold has internally disposed with pores where each of the pores connects with each other and any point on a surface of each of the pores has the hyperboloid structure. Since the surface of the scaffold is smooth and stress concentration is thereby avoided, the scaffold can withstand a greater external force in the case of the same porosity. Moreover, since the pores inside the scaffold connect with each other, the scaffold has a better permeability to fluid and is more conducive to tissue ingrowth. In addition, the scaffold has a large internal surface area, rendering it feasible to subsequent surface treatment, such as film coating, to be carried out on the internal surface of the scaffold.

12 Claims, 24 Drawing Sheets
(23 of 24 Drawing Sheet(s) Filed in Color)

SCAFFOLD COMPRISING SURFACE HYPERBOLOID STRUCTURE, METHODS FOR FABRICATION AND USE THEREOF

CROSS-REFERENCE TO RELATED APPLICATIONS

This application claims priorities from (1) U.S. provisional patent application No. 63/260,583 filed Aug. 26, 2021; and (2) Chinese patent application number 202210260137.5 filed Mar. 16, 2022, and the disclosures of which are incorporated herein by reference in their entirety.

TECHNICAL FIELD

The present invention generally relates to a scaffold having a surface hyperboloid structure, methods for fabrication and application thereof.

BACKGROUND OF THE INVENTION

Tissue engineering scaffold refers to a scaffold system that can be combined with living tissue cells and implanted into different tissues of the organism, and can replace the functions of the tissue according to the specific situation. It includes scaffolds for bone, cartilage, blood vessels, nerves, skin and artificial organs, among others.

Hyperboloids are common topological structures in nature. For example, coral, a living fossil dating back 500 million years, retains hyperboloid features on its mineralized surface. Coincidentally, after millions of years of natural selection, plant leaves also have this hyperboloid structure. The hyperboloid structure has positive and negative curvatures in two perpendicular directions at one point, which is thought to be beneficial in promoting coral calcification and enhancing photosynthesis by expanding the surface area of the leaves. The microstructure of mammalian trabecular bone has also been demonstrated to have this hyperboloid structure. That is, the hyperboloid structure may be a general result of evolution-oriented optimization in nature.

Tissue engineering scaffolds with hyperboloid structures can be used in a variety of tissue scaffolds, such as bone, cartilage, blood vessels, nerves, skin, and the like, but their specific applications are still not well understood.

Taking a bone scaffold as an example, the potential role of the bone scaffold having a hyperboloid structure in bone reconstruction has never been reached. Every year, more than 2 million bone transplants are performed worldwide, involving more than $2.5 billion in health care spending. Currently, bone tissue engineering scaffolds are considered to be the most effective way to treat large bone defects caused by trauma, tumors, and other infectious diseases because of their wide availability, mass production, and more controllability compared to autologous and allogeneic grafts. However, current bone tissue engineering scaffolds cannot achieve good clinical outcomes in large bone defects due to insufficient osteogenic and angiogenic capacity. To enhance the osteogenic and angiogenic potential of bone tissue engineering scaffolds, seeding of stem cells or incorporation with growth factors and/or drugs can be performed. However, these strategies have significant limitations due to the uncontrolled release and short half-life of growth factors/drugs, as well as the inevitable ethical and moral issues involved in seeding of stem cells.

Therefore, recent studies have focused on modulating physical stimuli of scaffolds to modulate cell behavior and function to enhance the osteogenic and angiogenic capabilities of scaffolds. For example, concave or convex surface topography has a significant impact on stem cell behavior and function, as they can affect protein aggregation on stem cell membranes or deform the nucleus, thereby activating different cell signaling pathways (e.g., Rho, Wnt, FAK, TGF-β/BMP) to modulate stem cell differentiation and promote bone repair. However, a bone tissue engineering scaffold having a trabecular bone biomimetic hyperboloid structure has not been fabricated, and the effect of the hyperboloid structure on regenerative cell behavior and function has never been addressed.

There is a need for a biological scaffold having a specific hyperboloid structure, which is applied to human tissues and organs such as bone, cartilage, blood vessels, nerves, skin and artificial organs.

SUMMARY OF THE INVENTION

According to one aspect of the present disclosure, a scaffold having a surface hyperboloid structure is disclosed. The scaffold has a plurality of pores disposed therein, and any point on a surface of each of the plurality of pores has the surface hyperboloid structure.

According to another aspect, a method for manufacturing the scaffold is disclosed. The method includes the following steps: 1) preparing raw materials; 2) preparing the raw materials into a 3D printing ink; 3) printing the prepared 3D printing ink into a scaffold using 3D printing technology.

In certain embodiments, Triply Periodic Minimal Surface (TPMS) structured 3D scaffolds which embody biomimicking hyperboloidal topography with varying Gaussian curvatures are provided. TPMS is a series of infinite, non-self-intersecting periodic surface structure in three principal directions. The TPMS structure has a hyperboloidal structure on every surface point with varying Gaussian curvatures. Gaussian curvature K of a surface at a point is a product of the principal curvatures, $K_1$ (positive curvature, a convex surface) and $K_2$ (negative curvature, a concave surface). The scaffolds can be fabricated with a body inherent with β-tricalcium phosphate (β-TCP) by stereolithography-based 3D printing and sintering. Through a thorough optimization of printing and sintering parameters, control over the 3D scaffold structures is achieved with excellent resolution, accuracy and reproducibility.

In certain embodiments, the resultant 3D TPMS scaffolds have high porosity, excellent interconnectivity, and impressive mechanical property (smoothly curved surfaces to eliminate stress concentration). The hyperboloidal topography enables the adhesion, proliferation, osteogenic differentiation and angiogenic paracrine of human mesenchymal stem cells (hMSCs) according to certain embodiments. The cells on the hyperbolic surfaces show contracted cell shape on concave ($K_2<0$) direction, whereas they present snail-like configuration on the convex ($K_1>0$) direction. Such curvature-induced cytoskeleton re-organization results in cytoskeletal contractility and nucleus deformation with higher Lamin-A/C expression, leading to "osteogenesis-angiogenesis coupling", which is critical for accelerated bone regeneration.

Furthermore, a method for treating a disease or condition associated with bone fractures, tissue damage, or bone loss in a subject in need thereof comprising implanting the proposed scaffold in the present disclosure into a bone defect or tissue damage region of the subject with a plurality of self-regenerative and proliferative stem cells capable of osteogenic differentiation coupled with angiogenic paracrine response is provided. An in vivo femoral defect model described herein demonstrates the impressive performance of the proposed TPMS scaffolds according to certain embodiments in terms of new bone formation. An in vivo subcutaneous implantation model described herein further validates the proposed scaffolds' substantial potential in supporting tissue infiltration and neovascularization in some other embodiments. These well-defined features can warrant the proposed TPMS scaffolds a head start towards a safer and more efficient bone graft with a notable clinical translation potential. The proposed structure will also provide guidelines to design simple, efficient and personalized bone grafts with simultaneous osteogenesis and angiogenesis; the TPMS concept is also transferable towards designing other bone implants such as metal or polymer prosthesis.

In certain embodiments, the subject includes, but not limited to, human and non-human animals.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objectives and features of the present disclosure will become apparent from the following description of the present disclosure when taken in conjunction with the accompanying drawings.

DETAILED DESCRIPTION OF THE EMBODIMENTS

While the invention is susceptible to many different forms of embodiment, preferred embodiments of the invention are shown in the accompanying drawings and are herein described in detail, with the understanding that this disclosure is to be regarded as illustrative of the principles of the invention, and it is not intended to limit the broad aspects of the invention to the embodiments shown. For the purposes of this Detailed Description, the words "and" and "or" shall be conjunctions and antonyms; the word "all" means "any and all"; the word "any" means "any and all"; and the word "any" means "any and all"; "including" means "including but not limited to".

Figure 1:
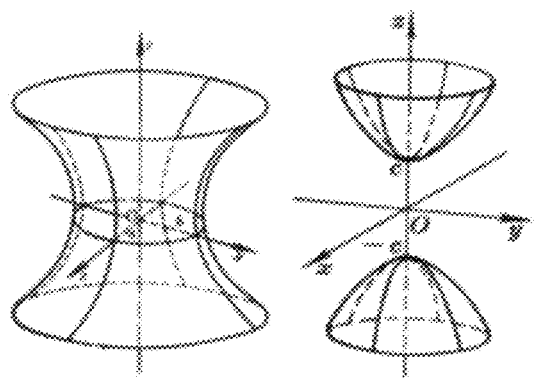
FIG. 1 shows a schematic diagram of a hyperboloid configuration.

A hyperboloid is a surface formed by revolving a hyperbola around its axis of symmetry. A hyperboloid is a quadratic surface, and as shown in FIG. 1, it is divided into a single-leaf hyperboloid and a double-leaf hyperboloid. A single-leaf hyperboloid is defined as:

$$\frac{x^2}{a^2} + \frac{x^2}{b^2} + \frac{x^2}{c^2} = 1$$

A double-leaf hyperboloid is defined as:

$$-\frac{x^2}{a^2} - \frac{x^2}{b^2} + \frac{x^2}{c^2} = 1$$

The Gaussian curvature of a hyperboloid is less than 0.

The present invention is intended to apply the above-mentioned hyperboloid to various scaffolds, to fabricate a scaffold having a hyperboloid structure. In this way, there are multiple pores inside the scaffold, and any point on the surface of the pores has a hyperboloid structure, that is, the Gaussian curvature is less than 0; each point may have different curvatures. These pores connect with each other.

The above-mentioned hyperboloid structure can take any suitable frame structure as required, such as a triply periodic minimal surface (TPMS) structure. The TPMS structure is a structure composed of continuous and smooth curved surfaces, allowing a large surface area and continuous internal channels, which can well avoid stress concentrations. At each point on the surface, it has a typical hyperboloid structure (the Gaussian curvature is less than 0).

The scaffold set forth in the present invention can be applied to various occasions, for example, as a biological scaffold in human tissues and organs such as bone, cartilage, blood vessels, nerves, skin and artificial organs.

The scaffold set forth in the present invention can be made from any suitable material by a suitable fabrication method according to specific application scenarios. For example, β-tricalcium phosphate (β-TCP) ceramic powder is used to make a bone scaffold system by 3D printing. The β-TCP ceramic powder has well-recognized good osteoconductivity and osteoinductivity for bone regeneration.

Polymer materials such as polymethyl methacrylate (PMMA) and gelatin methacrylate anhydride (GelMA) may also be used to print a skin scaffold system by photocuring. The use of GelMA which has excellent biocompatibility and similar properties to collagen can effectively promote the regeneration of epidermis.

Metal materials such as titanium alloys, magnesium alloys, and the like can also be used to fabricate joint prostheses by printing. Magnesium alloys have good mechanical support and can form a good osseointegration interface, thereby reducing the risk of osteolysis after prosthesis implantation.

During the fabrication of the above-mentioned scaffold having a hyperboloid structure, in order to further improve the performance of the material, raw materials such as $ZnCl_2$, $CuCl_2$, $MgCl_2$, $SrCl_2$ and the like can be added to the printed ceramic slurry as required, so that the obtained scaffold has one or more biologically active metal ions, such as $Zn^{2+}$, $Cu^{2+}$, $Mg^{2+}$, $Sr^{2+}$, $Mn^{2+}$, $Al^{3+}$, $Co^{2+}$, $Fe^{2+}$, $Ag^+$, $Li^+$, and the like and as a result, the scaffold has the required properties and functions. For example, by doping $Zn^{2+}$, the scaffold having a hyperboloid structure is endowed with an immunoregulatory effect and can modulate the immune response after implantation of the scaffold and promote the polarization of M2 macrophages, thereby promoting osseointegration; by doping $Cu^{2+}$, the scaffold having a hyperboloid structure is endowed with an antibacterial effect and can effectively inhibit bacterial proliferation after implantation of the bone scaffold and reduce the risk of implant infection; by doping $Mg^{2+}$ and $Sr^{2+}$ both having the ability to promote angiogenesis, the scaffold having a hyperboloid structure is endowed an ability to promote vascularization and can improve the early angiogenesis at the implant site, promote the exchange of nutrients and the proliferation of stem cells, and promote the process of bone regeneration. After the metal scaffold is prepared, the obtained scaffold can be further endowed with one or more different surface micro-nano structures by an electrocatalytic surface deposition method. In this way, the scaffold has the functions of promoting cell adhesion, osteoblast differentiation and the like, thereby promoting bone repair.

As needed, surface treatment can be carried out on the surface of the scaffold of the present invention so that the scaffold has better or desired properties in certain aspects. For example, a bioactive film can be applied to the surface of the scaffold to release/generate bioactive molecules, thereby enhancing the bioactivity of the scaffold. For a bone scaffold, the bioactive film can, for example, in situ catalyze the generation of nitric oxide (NO) from circulating substances in the body on the scaffold or load nitrosothiol-containing drugs to stably release NO. NO is an endogenous bioactive gas that can promote angiogenesis and regulate bone regeneration signaling pathways. NO-generating scaffolds are particularly helpful for patients with impaired neovascularization, such as patients with large bone defects or cancer patients receiving angiogenesis inhibitors, and can generate nitric oxide in situ thereon, thereby enhancing the biological activity of the scaffolds.

Based on 3D printing, the scaffold having a hyperboloid structure of the present invention can be fabricated by suitable preparation methods according to different preparation materials. The fabrication method includes the following steps:

1) preparing raw materials, wherein the raw materials can be the aforementioned ceramic powder, metal materials, polymers, and the like;
2) preparing the raw materials into 3D printing ink; and
3) printing the 3D printing ink into a scaffold using 3D printing technology.

Taking the use of β-TCP to fabricate a TPMS scaffold as an example, the fabrication method includes the following steps: 1) providing nano-β-TCP powder, photocrosslinkable photosensitive resin and a photoinitiator; 2) mixing the nano-β-TCP powder with the photocrosslinkable photosensitive resin, thoroughly ball milling and mixing the mixture, and adding an appropriate proportion of photoinitiator, thus obtaining a printable paste; and 3) importing a pre-designed TPMS scaffold into a printer, slicing the structure, and adding support if necessary. By optimizing the printing and post-processing parameters, scaffolds with different Gaussian curvatures can finally be fabricated.

For metal materials, titanium alloy TPMS scaffolds can be fabricated by selective laser melting (SLM). After the preparation and screening of titanium alloy powder, by optimizing the printing parameters, scaffolds having different Gaussian curvatures can finally be fabricated. The scaffold set forth in the present invention has a porous structure inside, and any point on the surfaces of the pores has a hyperboloid structure. In this way, good mechanical properties are achieved. Since the surface of the scaffold is smooth and stress concentration can be avoided, the scaffold can withstand greater force in the case of the same porosity. Moreover, the pores inside the scaffold are connected with each other, which achieves better permeability to fluid and is more conducive to tissue ingrowth. In addition, the scaffold has a large internal surface area, which is conducive to subsequent treatment, such as preparation of surface nanostructures by film coating or electrocatalytic deposition on the surface of the scaffold.

The following describes a scaffold having a hyperboloid structure according to a specific embodiment of the present invention with reference to FIG. 2 and FIGS. 3A to 3H. In this embodiment, a TPMS bone structure scaffold is designed, which is suitable for medical clinical applications such as bone transplantation and bone correction. The scaffold embodies a biomimetic hyperboloid structure at any point on the surface. The scaffolds in this embodiment are made from β-tricalcium phosphate (β-TCP ceramic powder) by 3D printing (e.g., lithography-based 3D printing) and have different mean Gaussian curvatures of 0, −2, −4 and −6 $mm^{-2}$ and a porosity of 60%. These scaffolds are denoted G0, G2, G4, and G6, respectively, where G0 is a conventional truss scaffold with a porosity of 60% and a Gaussian curvature of 0 and serves as a control, and G2, G4, and G6 have curvatures in the range of native trabecular bone.

Figure 2:
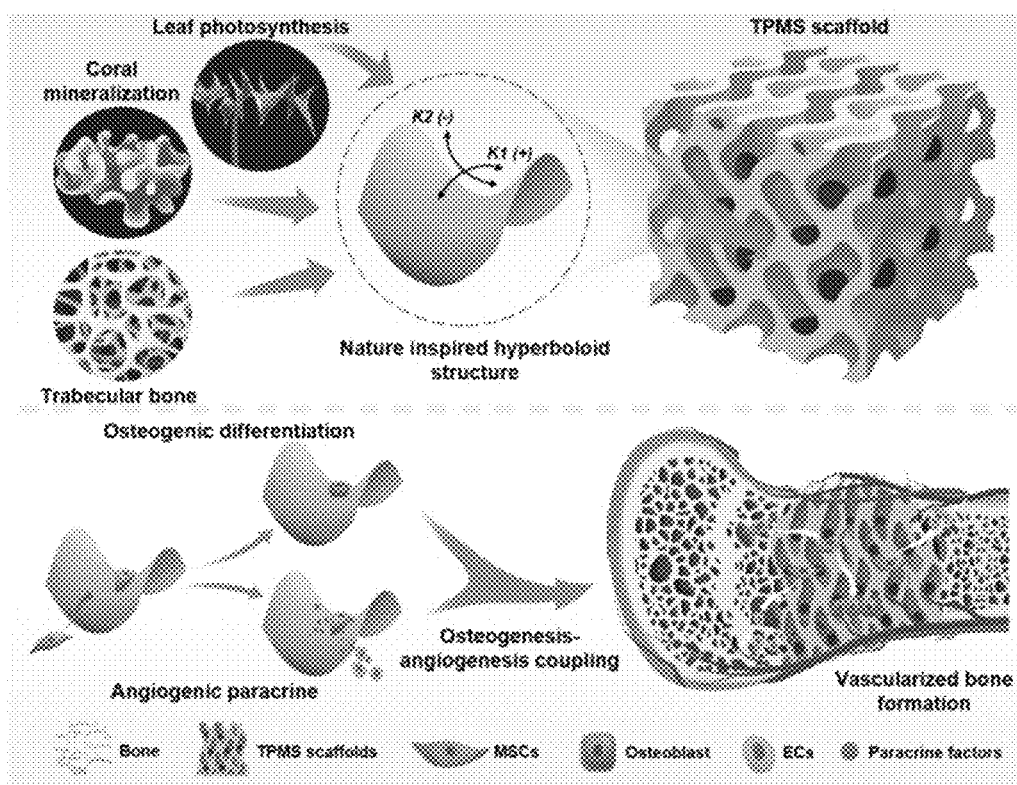
FIG. 2 shows the design and features of a TPMS scaffold according to an embodiment of the present invention.

FIG. 2 shows the design and features of the TPMS scaffold. Inspired by coral mineralization, leaf photosynthesis, and the microstructure of trabecular bone, the inventors design a TPMS bone scaffold for clinical implantation in patients to assist in bone regeneration in patients.

Figure 3A:
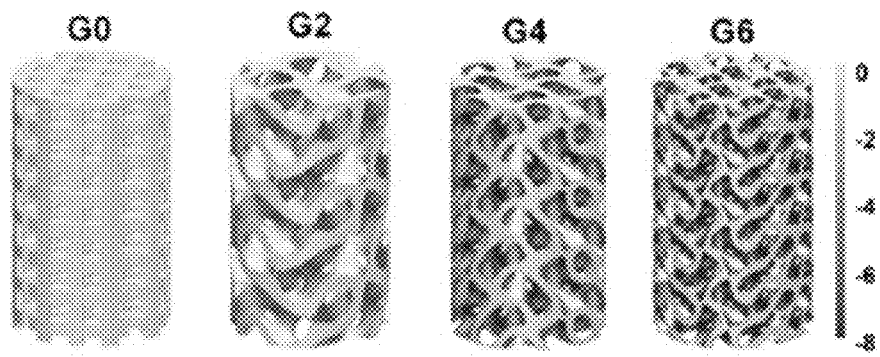
FIG. 3A shows Gaussian curvature distribution of TPMS scaffolds according to certain embodiments.
Figure 3B:
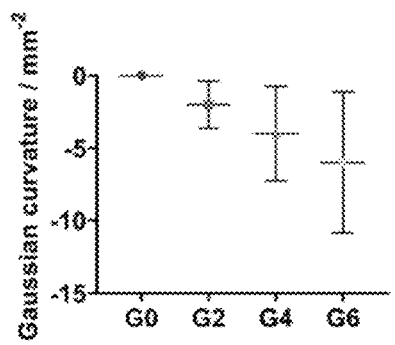
FIG. 3B shows quantification of Gaussian curvature of the TPMS scaffolds according to certain embodiments.
Figure 3C:
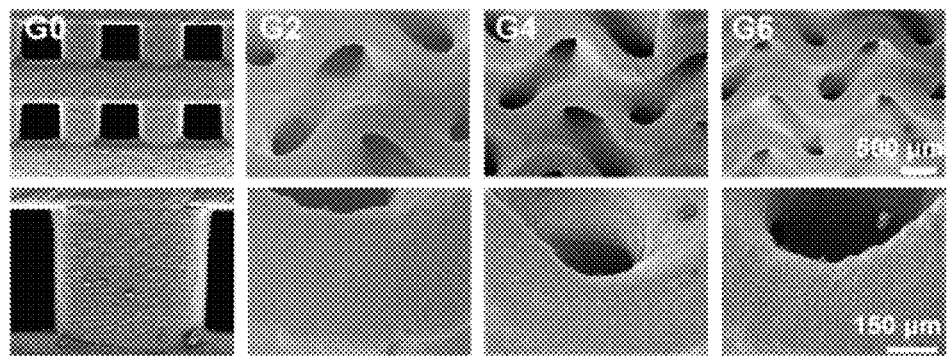
FIG. 3C shows SEM images of a 3D printed TPMS scaffolds according to certain embodiments.
Figure 3D:
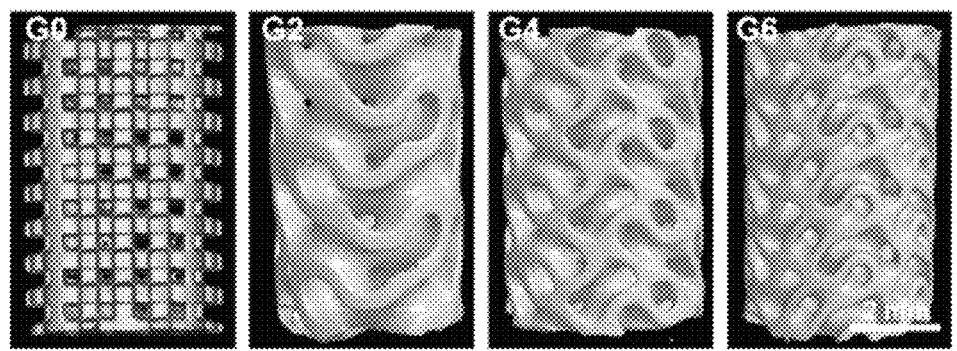
FIG. 3D shows reconstructed micro-CT images of the TPMS scaffolds according to certain embodiments.
Figure 3E:
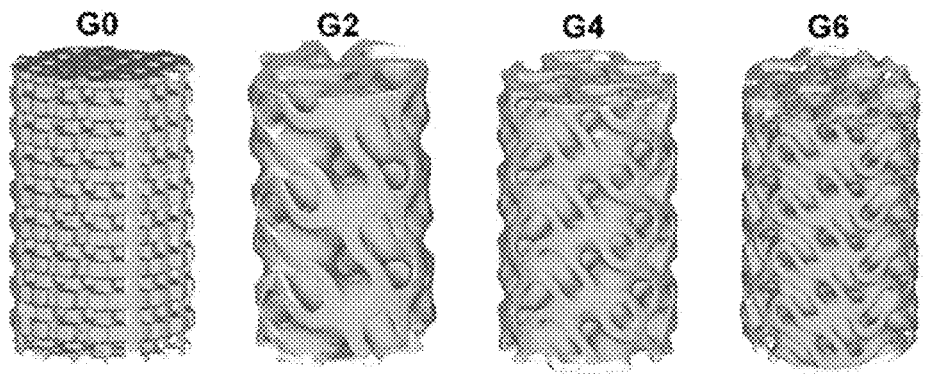
FIG. 3E shows geometrical completeness of the scaffolds assessed by comparing CAD model (gray) with the corresponding 3D shape (orange) reconstructed by micro-CT.
Figure 3F:
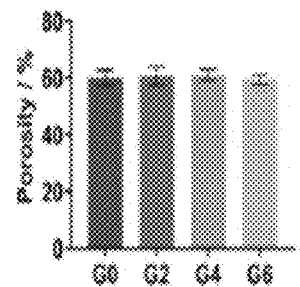
FIG. 3F shows quantified porosities of the scaffolds G0, G2, G4 and G6.

In certain embodiments, Gyroid-type TPMS scaffolds are provided with different average Gaussian curvatures of −2, −4 and −6 $mm^{-2}$ (denoted as G2, G4 and G6) with 60% porosity (FIG. 3A). Gyroid-type is chosen because it has excellent fluid permeability and mechanical properties. Gaussian curvatures of −2, −4 and −6 $mm^{-2}$ and 60% porosity are chosen as they are in range of natural trabecular bone. The conventional truss scaffold with 60% porosity and 0 Gaussian curvature is used as control (denoted as G0). In the geometric modeling, the curvature mapping is calculated for all scaffolds in which the G2, G4 and G6 groups presented apparently distinct Gaussian curvature distribution from −2 to −6 $mm^{-2}$, while the G0 group shows 0 Gaussian curvature on all surfaces of the scaffolds (FIGS. 3A and 3B). β-TCP TPMS scaffolds are then fabricated using stereolithography-based 3D printing. FDA approved β-TCP ceramics ($Ca_3(PO_4)_2$) are used in these embodiments due to its excellent biocompatibility. Nano-sized β-TCP powders are mixed with photo-crosslinkable resin to make the 3D printing bone ink, then 3D TPMS scaffolds are printed by stereolithography-based 3D printing and further reinforced by sintering. A thorough optimization of printing and sintering parameters is carried out, achieving control over the 3D scaffold structures with excellent resolution, accuracy and reproducibility. Representative scanning electron microscope (SEM) images of the fabricated scaffolds presented smooth and dense surfaces with no appearance of defects and revealed an excellent resolution of the printing process with an accurate recapitulation of the hyperboloidal topology (FIG. 3C). The spatially internal structure of the scaffolds is evaluated by high-resolution micro-CT analysis (FIG. 3D). All scaffolds present excellent inter-connected pores (FIG. 3F), which are beneficial to neo-tissue infiltration and nutrient exchange. Additionally, the geometrical completeness of the scaffolds was assessed by comparing its CAD model (gray) with the corresponding 3D shape (orange) reconstructed by micro-CT (FIG. 3E). All scaffolds present high overlap in the whole 3D structure. Quantitatively, the reproducibility of porosity, mean pore size, and strut thickness of all printed scaffolds ranged from 93.33%-98.89% (Table 1), indicating the accurate printing process and representation of the topology characteristics of our designed scaffolds.

TABLE 1

Reproducibility of scaffolds G0, G2, G4 and G6 determined by micro-CT

|  | G0 | G2 | G4 | G6 |
|---|---|---|---|---|
| Porosity | 97.78 ± 0.79 | 96.67 ± 1.36 | 98.89 ± 0.79 | 98.89 ± 0.79 |
| Mean pore size (%) | 95.83 ± 1.18 | 94.67 ± 2.05 | 97.33 ± 0.94 | 97.62 ± 2.43 |
| Strut thickness | 95 ± 2.04 | 95.56 ± 1.81 | 93.33 ± 2.72 | 95.56 ± 4.16 |

N.B.:

$$\text{Reproducibility of porosity} = \frac{\text{Porosity of fabricated scaffolds}}{\text{Porosity of designed scaffolds}} \times 100\%$$

$$\text{Reproducibility of mean pore size} = \frac{\text{Mean pore size of fabricated scaffolds}}{\text{Mean pore size of designed scaffolds}} \times 100\%$$

$$\text{Reproducibility of strut thickness} = \frac{\text{Strut thickness of fabricated scaffolds}}{\text{Strut thickness of designed scaffolds}} \times 100\%$$

Figure 3G:
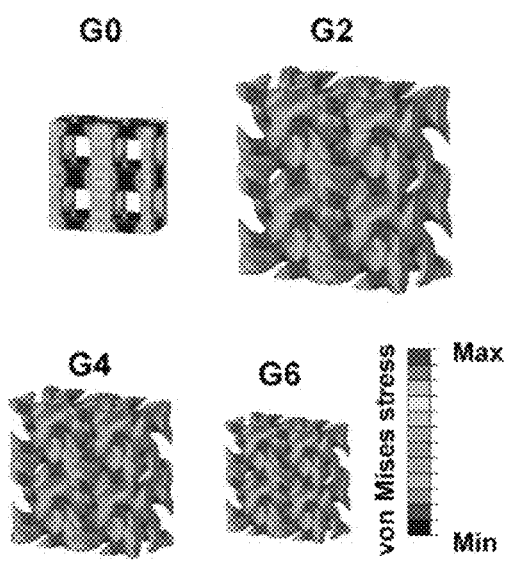
FIG. 3G shows the von-Mises stress distribution of the conventional truss scaffold (G0) and TPMS scaffolds under compression with four-unit cells analyzed; G0, G2, G4 and G6 means Gaussian curvature distribution of 0, −2, −4 and −6 mm$^{-2}$, respectively. Sample size n=3 for all experiments by a one-way ANOVA with a Tukey's post hoc test for multiple comparison. Data are presented as mean±SD. *$p<0.05$, $p<0.01$, and *$p<0.001$ denote the statistical significance.
Figure 3H:
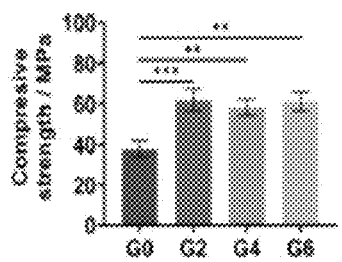
FIG. 3H shows compressive strength of the TPMS scaffolds according to certain embodiments.

Mechanical properties of the scaffolds with different Gaussian curvatures are further evaluated. It is found that the TPMS groups present compressive strength of 61.93±5.54 MPa (G2), 58.27±4.05 MPa (G4), and 61.13±4.45 MPa (G6) respectively, which was significantly higher compared to the control group (G0) of 37.67±3.92 MPa with same porosity (FIG. 3H). This is because that the TPMS design could effectively minimize the stress concentration and facilitate the load bearing capacity under compression (FIG. 3G). Notably, the compressive strength of the TPMS scaffolds is comparable to the mechanical property of natural trabecular bone (10-70 MPa) with same porosity. In the present invention, high-resolution 3D TPMS scaffolds have been successfully fabricated with excellent reproducibility, biomimetic hyperboloidal topography, varying Gaussian curvatures and appropriate mechanical properties.

Figure 4A:
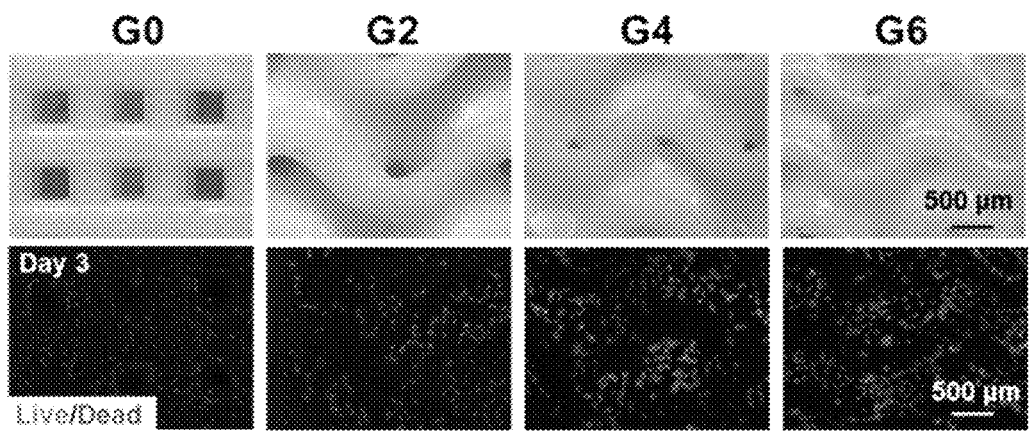
FIG. 4A shows the cytocompatibility of scaffolds G0, G2, G4 and G6.
Figure 4B:
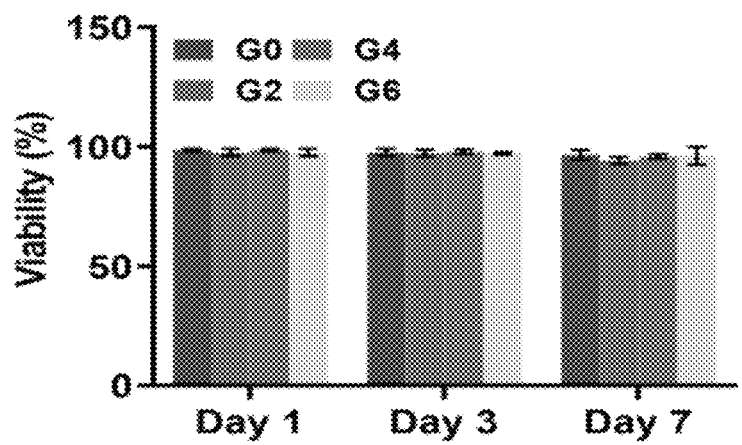
FIG. 4B shows the viability after cell culture.
Figures 4C, 4D:
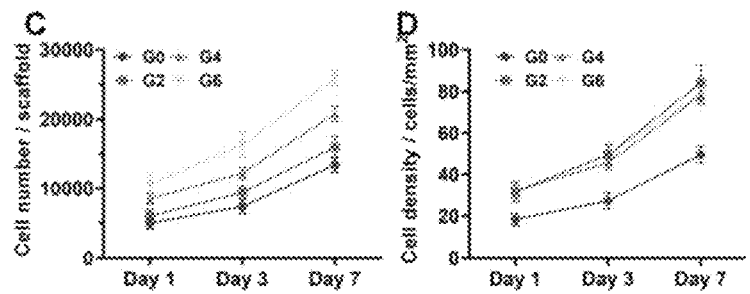
FIG. 4C shows the cell number of hMSCs on the scaffolds according to certain embodiments.
FIG. 4D shows the cell density of hMSCs on the scaffolds according to certain embodiments.

FIG. 4A shows the cytocompatibility of scaffolds G0, G2, G4 and G6. As shown in the figure, the scaffolds in each group have excellent cytocompatibility, and no obvious cell death is observed on Day 3 after the culture of hMSCs (human mesenchymal stem cells). FIG. 4B shows the viability after cell culture, where the viability for all the scaffolds in each group is greater than 90%. To further evaluate the cell seeding efficiency and cell density on different porous scaffolds, the cells are dissociated from the corresponding scaffolds and their cell densities are calculated through normalizing the cell number to the surface area of the scaffolds. FIG. 4C shows the proliferation efficiencies of hMSCs on the scaffolds, where the proliferation efficiencies of G6 on Day 3 and Day 7 are significantly higher than those of other groups. FIG. 4D shows that the cell density (cell number/surface area) on the hyperboloidal surfaces of the G2, G4, and G6 groups is significantly higher than that of the flat surface of the G0 group on Day 1, 3 and 7, and there is no significant difference in cell density among TPMS groups. This higher cell proliferation of the TPMS scaffolds could be attributed to the curved surfaces with enhanced cell retention rate and cell adhesion efficiency. These results indicated the distinct cytocompatibility of the TPMS scaffolds. $*p<0.05$, $p<0.01$ and $*p<0.001$ indicate statistical significance.

Figure 5A:
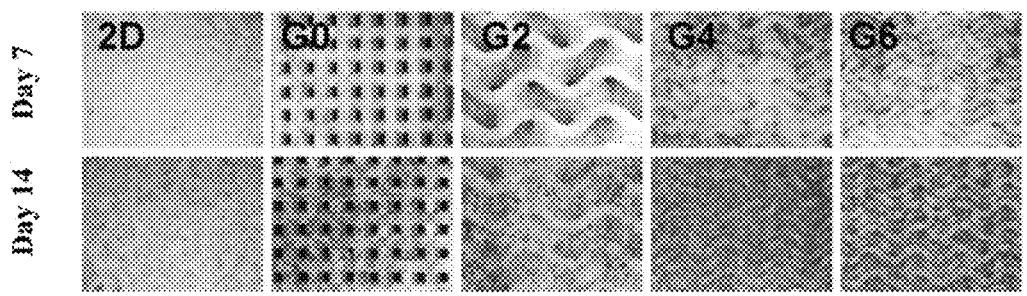
FIG. 5A shows the osteogenic inducibility of scaffolds G0, G2, G4 and G6 by alkaline phosphatase (ALP) staining of hMSCs; 2-D flat β-TCP plate (2D) serves as a control.
Figure 5B:
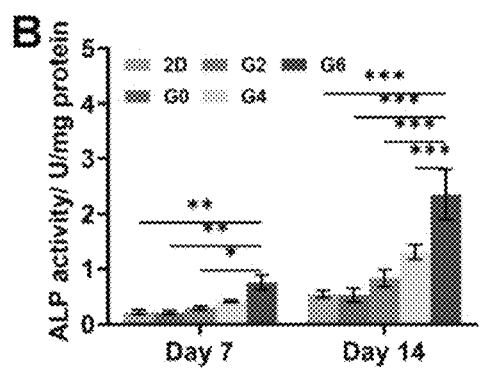
FIG. 5B shows quantification of ALP activity of hMSCs at Day 7 and Day 14 on different scaffolds as shown in FIG. 5A.
Figure 5C:
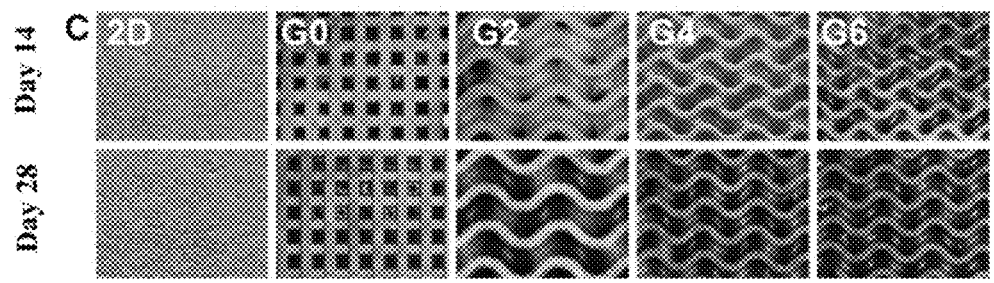
FIG. 5C shows the osteogenic inducibility of scaffolds G0, G2, G4 and G6, and control (2D) by alizarin red S (ARS) staining of hMSCs.
Figure 5D:
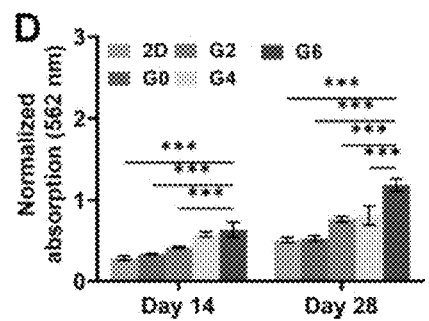
FIG. 5D shows quantification mineralization of hMSCs at Day 14 and Day 28 on different scaffolds as shown in FIG. 5C.
Figure 5E:
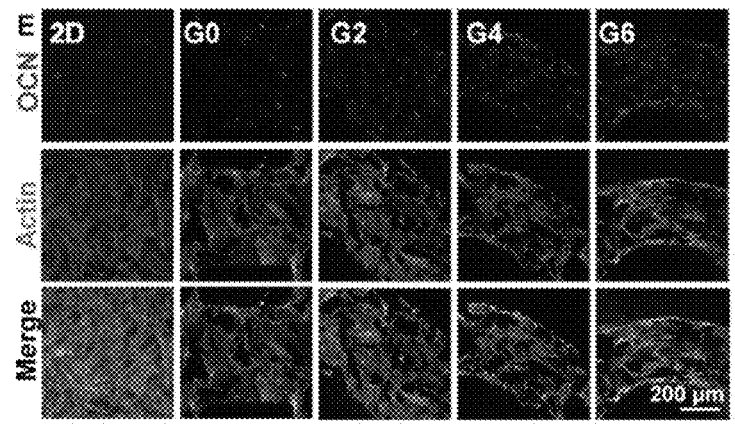
FIG. 5E shows immunofluorescence staining of osteocalcin (OCN) expression of hMSCs seeded on different scaffolds G0, G2, G4, G6 and 2D after 7 days of incubation.
Figure 5F:
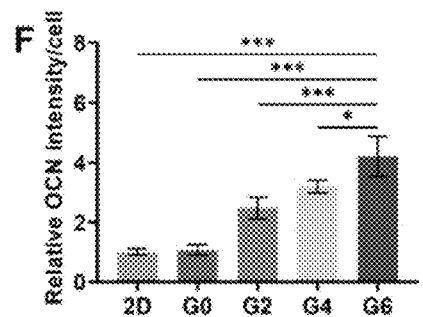
FIG. 5F shows OCN expression level of hMSCs on different scaffolds at Day 7 as in FIG. 5E.
Figure 5G:
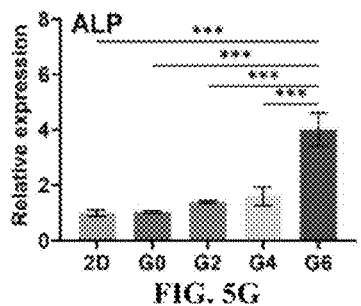
FIG. 5G shows ALP expression of hMSCs on different scaffolds at Day 7.
Figure 5H:
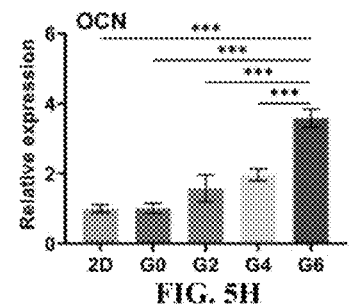
FIG. 5H shows OCN expression of hMSCs on different scaffolds at Day 7.
Figure 5I:
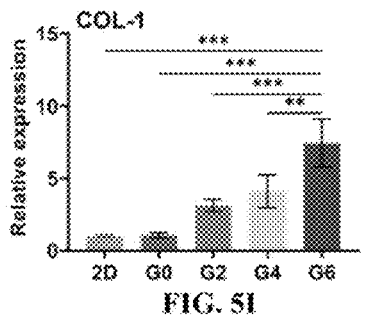
FIG. 5I shows COL-1 expression of hMSCs on different scaffolds at Day 7.
Figure 5J:
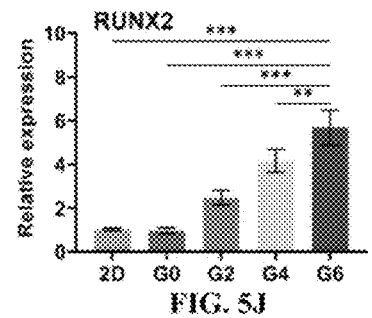
FIG. 5J shows RUNX2 expression of hMSCs on different scaffolds at Day 7.

FIGS. 5A to 5J show the osteogenic inducibility of different TPMS scaffolds (G0, G2, G4 and G6). Osteoinduction can effectively promote the osteogenic differentiation of hMSCs. To assess the effect of the hyperboloidal structure on the osteogenic potential of hMSCs, an in vitro osteogenesis evaluation by seeding hMSCs onto different TPMS scaffolds is performed. Moreover, to exclude the possible effect of the lower cell density on the osteogenesis evaluation of the G0 group as demonstrated in the foregoing examples, a 2-D flat β-TCP plate (denoted as 2D) is employed as a standard control in this evaluation by seeding the same cell density of hMSCs on the 2D sample as on those TPMS scaffolds. Alkaline phosphatase (ALP), which is an early marker of osteogenesis and plays an important role in osteoblastic differentiation, is first evaluated by staining and activity quantification. The three TPMS groups (G2, G4, G6) present more staining areas than the G0 group and the control (2D) flat group (FIG. 5A). In addition, the G6 group demonstrates the largest staining area on both time points (day 7 and 14). Quantitatively, the G4 and G6 groups present 2.46 and 4.46-fold increased ALP activity compared to that of the G0 group and 2.39 and 4.30-fold compared to that of the control flat group at day 14 (FIG. 5B). To evaluate the degree of extracellular matrix (ECM) mineralization of hMSCs on different TPMS scaffolds, alizarin red S (ARS) staining was conducted as this assay is a common strategy to evaluate the ECM mineralization in cells or tissues. The ARS staining results show that after 14 days of incubation, more calcium nodule deposition was formed on the G2, G4 and G6 groups (FIG. 5C). The quantification analysis normalized by cell number revealed that the G6 group exhibited approximately 1.91-fold and 2.25-fold increase in mineralization compared to the G0 group after 14 and 28 days respectively (FIG. 5D). The immunofluorescence staining of osteocalcin (OCN, osteogenic marker) also shows more positive staining on TPMS groups than the G0 and the control group (FIGS. 5E and 5F). Moreover, analysis of the osteogenic gene expression of hMSCs supports the notion that the TPMS groups could promote the osteogenic differentiation of hMSCs with significantly increased expression of osteogenic genes including ALP, OCN, collagen-1 (COL-1) and runt-related transcription factor 2 (RUNX-2) (FIGS. 5G to 5J). Collectively, these results indicated that the TPMS scaffolds with hyperboloidal topology could effectively promote the hMSCs' osteogenic differentiation compared to the G0 group and the flat control group with same cell density, and the G6 group with the largest Gaussian curvature shows the best promotion efficacy. FIG. 5A shows that with an increase in curvature, the scaffolds increase the positive rate of alkaline phosphatase staining, and FIG. 5B shows that scaffolds G2, G4 and G6 can significantly increase the alkaline phosphatase activity of cells. FIGS. 5C and 5D show that scaffolds G2, G4 and G6 significantly promote alizarin red staining for the late-stage osteogenic marker. Sample size n=3 for all experiments by a one-way or two-way ANOVA with a Tukey's post hoc test for multiple comparison. Data are presented as mean±SD. $*p<0.05$, $p<0.01$ and $*p<0.001$ indicate statistical significance.

Figure 6A:
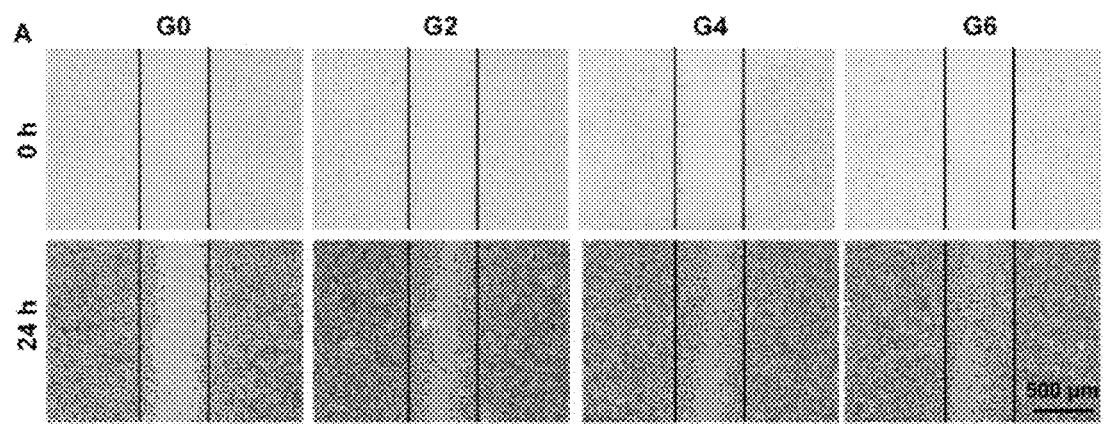
FIG. 6A shows the paracrine effect of hMSCs and different Gaussian curvatures of the present scaffolds on HUVECs migration from the results of a wound healing assay before and after being cultured in a conditioned medium for 24 hours where the conditioned medium is obtained from seeding hMSCs on different scaffolds according to certain embodiments.
Figure 6B:
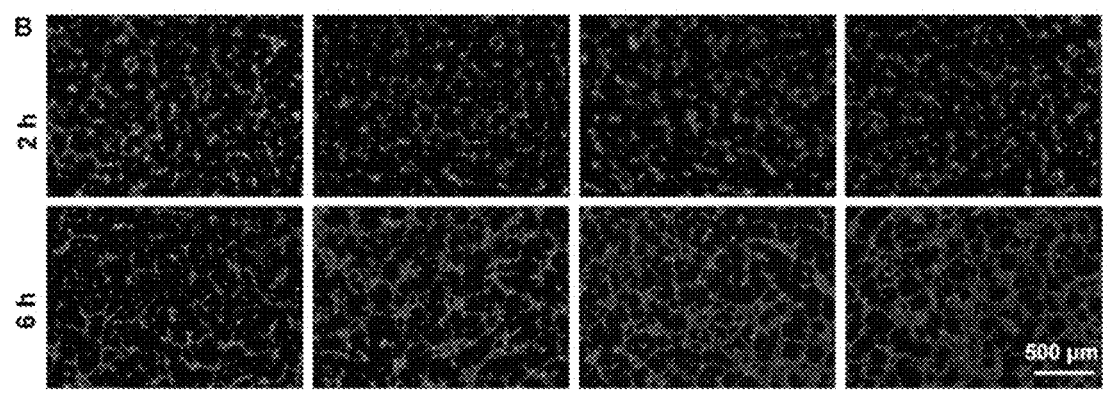
FIG. 6B shows the paracrine effect of hMSCs and different Gaussian curvatures of the present scaffolds on 3D tube-like formation in human umbilical vein endothelial cells (HUVECs) from the results of a tube formation assay of HUEVCs cultured in the same conditioned medium used in the wound healing assay according to FIG. 6A for 2 and 6 hours, respectively.
Figure 6C:
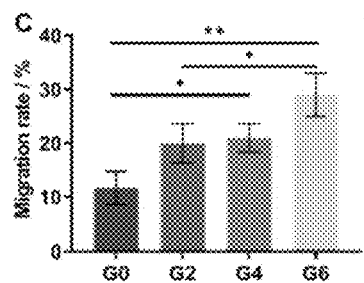
FIG. 6C shows the difference in cell migration rate of HUVECs with conditioned media obtained from different groups of scaffolds in the wound healing assay according to FIG. 6A.
Figure 6D:
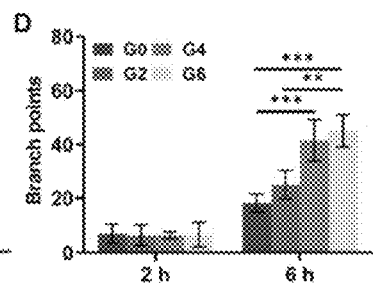
FIG. 6D shows the difference in branching points of HUVECs with conditioned media obtained from different groups of scaffolds in the tube formation assay according to FIG. 6B.
Figure 6E:
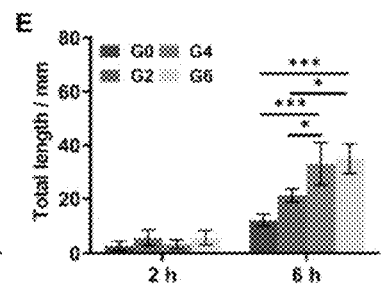
FIG. 6E shows the difference in total length of HUVECs with conditioned media obtained from different groups of scaffolds in the tube formation assay according to FIG. 6B.

FIGS. 6A-6E show an evaluation of angiogenic paracrine function of hMSCs and effect of hyperboloidal topology of the proposed TPMS scaffolds on cell migration and proliferation of HUVECs, a type of human endothelial cells which angiogenesis has been shown to promote bone regeneration. Initially, a conditioned culture medium is prepared by seeding hMSCs at a specific density on different TPMS scaffolds (G0, G2, G4, and G6) in a culture medium. In certain embodiments, the culture medium contains Minimum Essential Medium a (MEM a) and Endothelial Cell Medium (ECM) in 1:1 ratio; the specific density of hMSCs seeded on different TPMS scaffolds is $1\times10^4$ cells/cm$^2$. After 3 days of incubation, the culture medium is collected as the conditioned culture medium and applied to culture HUVECs. Preferably, $5\times10^4$ cells/cm$^2$ of HUVECs is used to culture in the conditioned culture medium. When the seeded HUVECs become confluent, a wound healing assay is performed to evaluate the paracrine effect of hMSCs and the effect of different Gaussian curvatures on cell migration of HUVECs. As seen in FIG. 6A, the conditioned culture medium obtained from hMSC culture on TPMS scaffolds enhances cell migration of HUVECs. The quantification results as shown in FIG. 6C suggest that a larger Gaussian curvature (G6 group) accelerates HUVEC migration compared with other TPMS groups (G0, G2 and G4).

To further examine the effect of hMSCs' paracrine on the formation of 3D tube-like structure of HUEVCs, a tube formation assay on HUVECs cultured in the conditioned culture medium obtained from hMSC culture on different TPMS scaffolds is performed. Immunofluorescence staining of calcein in HUVECs is used to determine tubular structure formation, and fluorescence images of the markers are taken at 2 hours and 6 hours of incubation with the conditioned culture medium (FIG. 6B). It is observed that among different TPMS groups, the conditioned culture medium obtained from G6 group with the largest Gaussian curvature of the hyperboloidal structure present 2.85-fold increase in the number of branching points (FIG. 6D) and 2.46-fold increase in total tube length (FIG. 6E) at 6 hours compared to the results from the same group obtained at 2 hours of incubation with the corresponding conditioned culture medium, which is the highest among different TPMS groups. These results indicate that hyperboloidal topology with a larger Gaussian curvature promotes angiogenesis of corresponding endothelial cells through enhancing the angiogenic paracrine response of hMSCs to stimulate paracrine secretion.

The results in FIGS. 5A-5J and 6A-6E demonstrate that the proposed TPMS scaffolds with hyperboloid topology could promote osteogenic differentiation and angiogenic paracrine response of hMSCs. To explore the possible underlying mechanisms, four types of β-TCP hyperboloid surface scaffolds with corresponding Gaussian curvature of 3D TPMS scaffolds (0 (control), −2, −4, and −6 mm$^{-2}$) are fabricated by 3D printing to observe single cell morphology on the hyperboloid topology. The printing direction aligns with the concave ($K_2$<0) direction (FIG. 7A) or the convex ($K_1$>0) direction (FIG. 7B). SEM and 3D laser microscopic scanning are employed to analyze the hyperboloid topology of these scaffolds and verify that the as-fabricated scaffolds are in accordance with the proposed design.

Figure 7A:
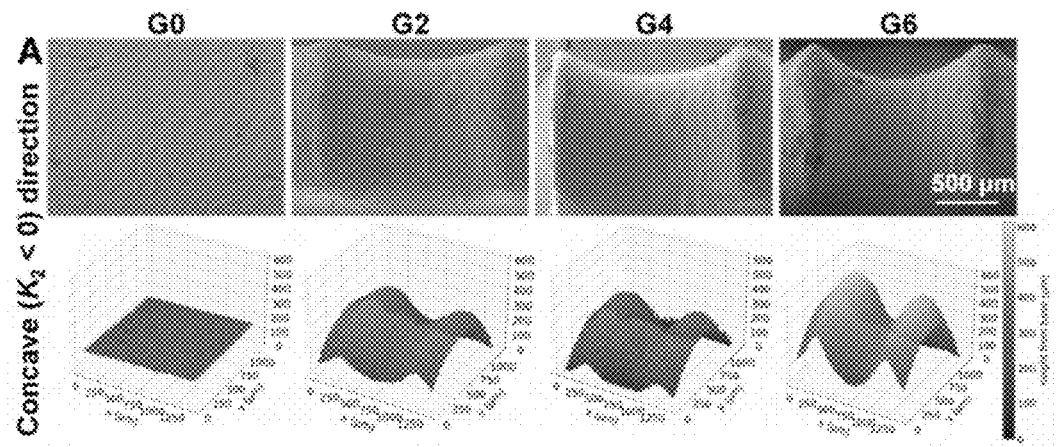
FIG. 7A shows characterization of hyperboloid surface scaffolds printed in the concave ($K_2<0$) direction by SEM (upper panel) and 3D laser microscopy (lower panel)
Figure 7B:
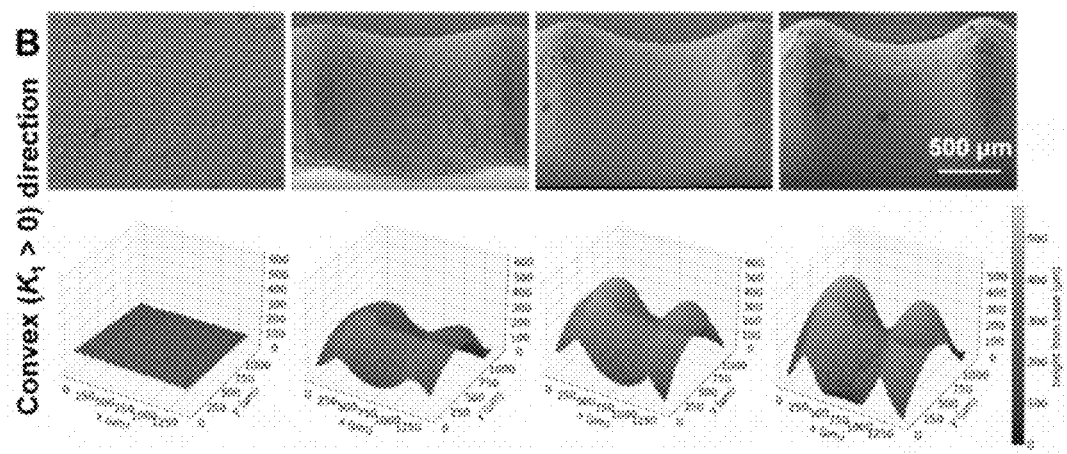
FIG. 7B shows characterization of hyperboloid surface scaffolds printed in the convex ($K_1>0$) direction by SEM (upper panel) and 3D laser microscopy (lower panel)
Figure 8A:
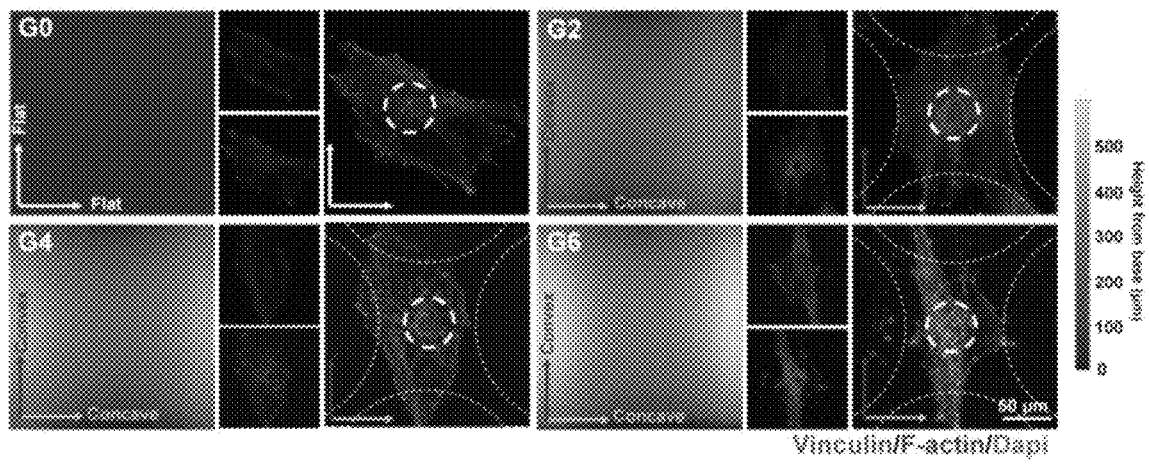
FIG. 8A shows immunofluorescence staining of vinculin (green), F-actin (red) and nuclei (blue) of hMSCs on hyperboloid surfaces of scaffolds G0, G2, G4 and G6 printed in the concave ($K_2<0$) direction according to certain embodiments.

FIGS. 8A to 8D show the modulation effect of scaffolds G0, G2, G4 and G6 on cell morphology, where the hyperboloid surfaces of the scaffolds are printed in a concave ($K_2$<0) direction as in FIG. 7A. FIG. 8A shows the surface heights of different scaffolds and the immunostaining of the cytoskeleton (F-actin) and focal adhesion protein (vinculin) of corresponding hMSCs on different scaffolds. As shown in FIG. 8A, with an increase in curvature, the cell morphology gradually becomes narrower and elongated, and the attachment position of the focal adhesions approaches the nucleus.

Figure 8B:
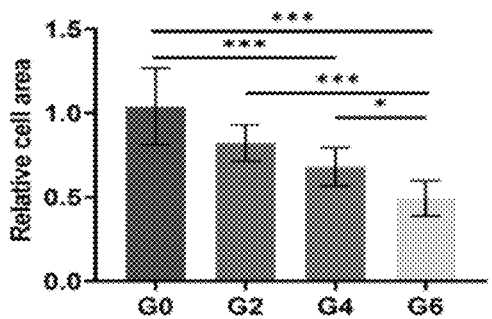
FIG. 8B shows quantification of cell area of hMSCs on scaffolds G0, G2, G4 and G6 as shown in FIG. 8A.
Figure 8C:
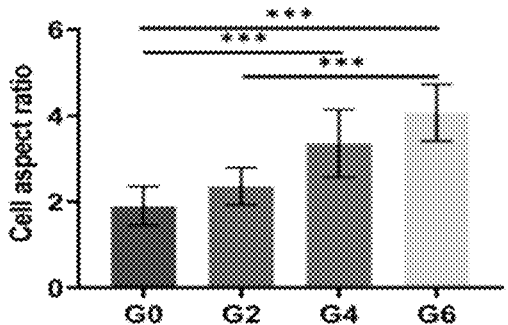
FIG. 8C shows quantification of cell aspect ratio of hMSCs on scaffolds G0, G2, G4 and G6 as shown in FIG. 8A.

FIG. 8B shows relative values of cell area after attachment of hMSCs. As shown in FIG. 6B, with an increase in curvature, the attachment area of hMSCs gradually decreases. FIG. 8C shows the aspect ratio of the cell size after the attachment of hMSCs. As shown in FIG. 8C, with an increase in the curvature, the aspect ratio of hMSCs gradually increases. *$p<0.05$, $p<0.01$ and *$p<0.001$ indicate statistical significance. Interestingly, an obvious stress fiber (SF) re-organization is observed on the hyperboloid surfaces of G2, G4 and G6 scaffolds. The SF present distinctly elongated orientation in the convex ($K_1$>0) direction while they present contracted cell morphology in the concave ($K_2$<0) direction. The G4 and G6 groups show significantly decreased cell area and increased aspect ratio (3.36 and 4.06 for G4 and G6, respectively).

Figure 8D:
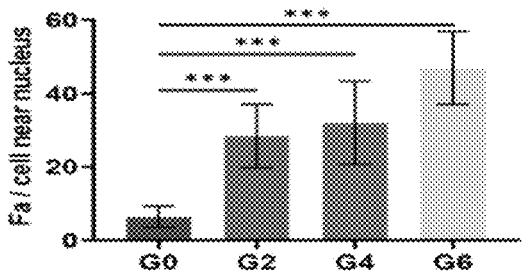
FIG. 8D shows quantification of focal adhesion (Fa) near nuclei of hMSCs on scaffolds G0, G2, G4 and G6 as shown in FIG. 8A.

FIG. 8D shows the expression of focal adhesion (FA) protein in the vicinity of the nucleus after the attachment of hMSCs. As shown in FIG. 8D, with an increase in curvature, the expression of focal adhesions in the nuclei of hMSCs gradually increases. *$p<0.05$, $p<0.01$ and *$p<0.001$ indicate statistical significance. From FIGS. 8A and 8D, the G0 group present more vinculin (FA protein) expression in the periphery of the cells at the end of actin filament; however, the G2, G4, and G6 groups demonstrate more vinculin expression in the vicinity of the cell nucleus, indicating cellular attachment mode shift.

The results from FIGS. 8A-8D could be attributed to the cell contractility modulation on the hyperboloid surfaces. On the hyperboloid surfaces, the cells show contracted cell shape on the concave ($K_2$<0) direction, whereas they present snail-like configuration on the convex ($K_1$>0) direction with an increased FA intensity near the nucleus. These results are consistent with some previous findings that cells on concave ($K_2$<0) surfaces underwent obvious cell contraction, while they tended to elongate radially on convex ($K_1$>0) surfaces.

Figure 9A:
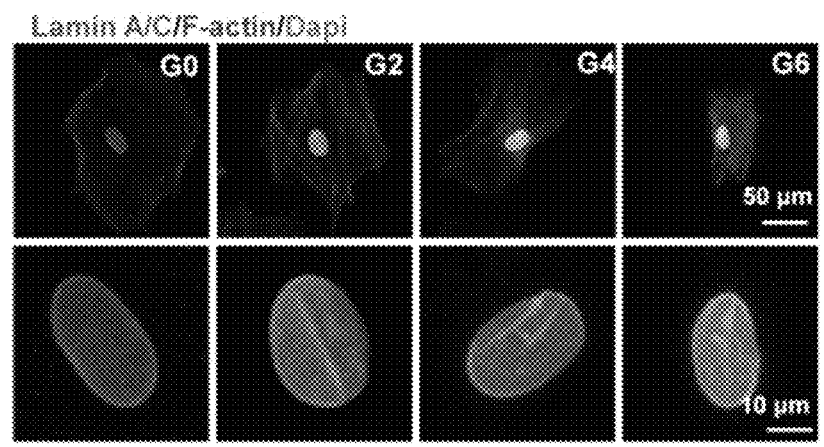
FIG. 9A shows immunofluorescence staining of Lamin A/C (green), F-actin (red) and nuclei (blue) in hMSCs on hyperboloid surfaces of scaffolds G0, G2, G4 and G6 according to certain embodiments.
Figure 9B:
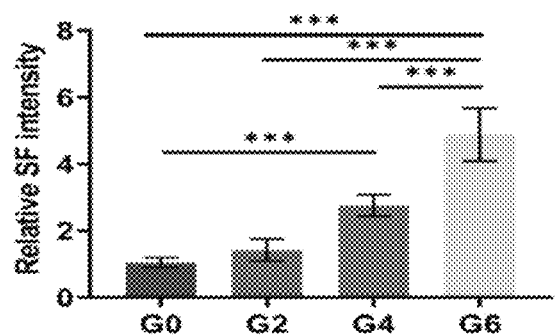
FIG. 9B shows quantification of stress fiber (SF) intensity of hMSCs as shown in FIG. 9A.
Figure 9C:
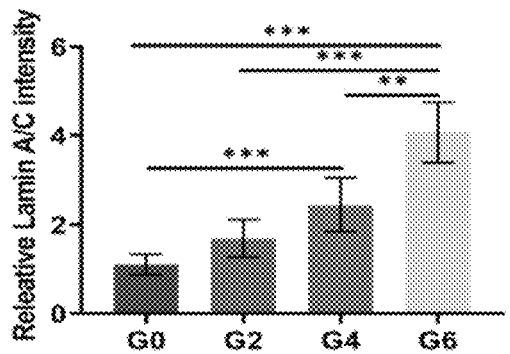
FIG. 9C shows quantification of Lamin A/C intensity of hMSCs as shown in FIG. 9A.
Figure 9D:
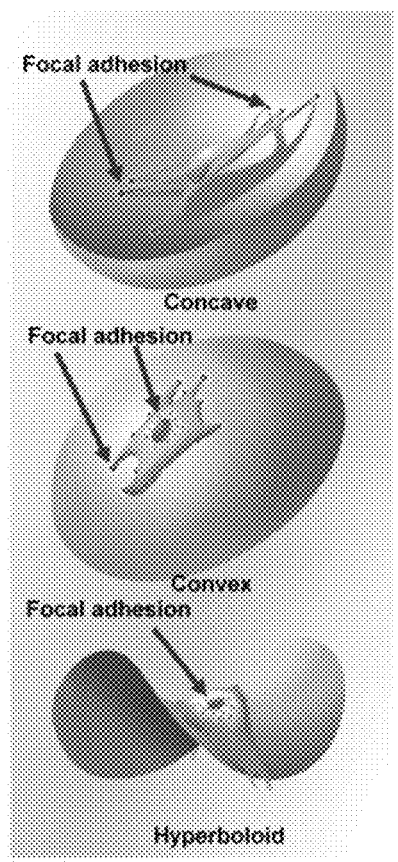
FIG. 9D schematic depicts a topology-induced cytoskeleton organization on concave, convex and hyperboloid surfaces; arrows indicate the focal adhesion sites of the cells.

FIGS. 9A to 9C show the modulation effect of scaffolds G0, G2, G4 and G6 on nuclear morphology. FIG. 9A shows the nuclear morphologies of hMSCs on different scaffolds. As shown in FIG. 9A, with an increase in the curvature, the cell morphology gradually shows a shrinking change, which is the most obvious in the G6 group. The cell nuclei are flattened and smooth on the flat G0 surfaces, while they present shrunken bean-like morphology on the hyperboloid surfaces (G2, G4 and G6). FIG. 9B shows that the G2, G4, and G6 groups have significantly higher SF intensity than that of the G0 group, possibly due to the enhanced cell contractility to counteract the curvature-induced cytoskeleton re-organization. Such modulated cell contractility could further impose critical external forces to deform the cell nucleus through the interaction between the SF and the nucleus membrane to regulate the cell fate. FIG. 9C shows the relative intensity of nuclear membrane protein expression. As shown in FIG. 9C, with an increase in curvature, the nuclear membrane protein expression gradually increases. The Lamin-A/C signals of the G6 group also shows a nearly 4.06-fold higher intensity than that of the G0 group, indicating the higher SF force imposed on the cell nuclei (*$p<0.05$, $p<0.01$ and *$p<0.001$ indicate statistical significance). These results collectively indicate that the hyperboloid topology could induce the cytoskeleton re-organization of hMSCs and further impose external forces to the cell nucleus and affect their morphology. A schematic shown in FIG. 9D assists the illustration of the effect of hyperboloid topology on the afore-mentioned cytoskeleton re-organization mechanism. Such nuclear morphology regulation could lead to a cascade of cell behavior modulation such as osteogenic differentiation and angiogenic paracrine of hMSCs.

Figure 10:
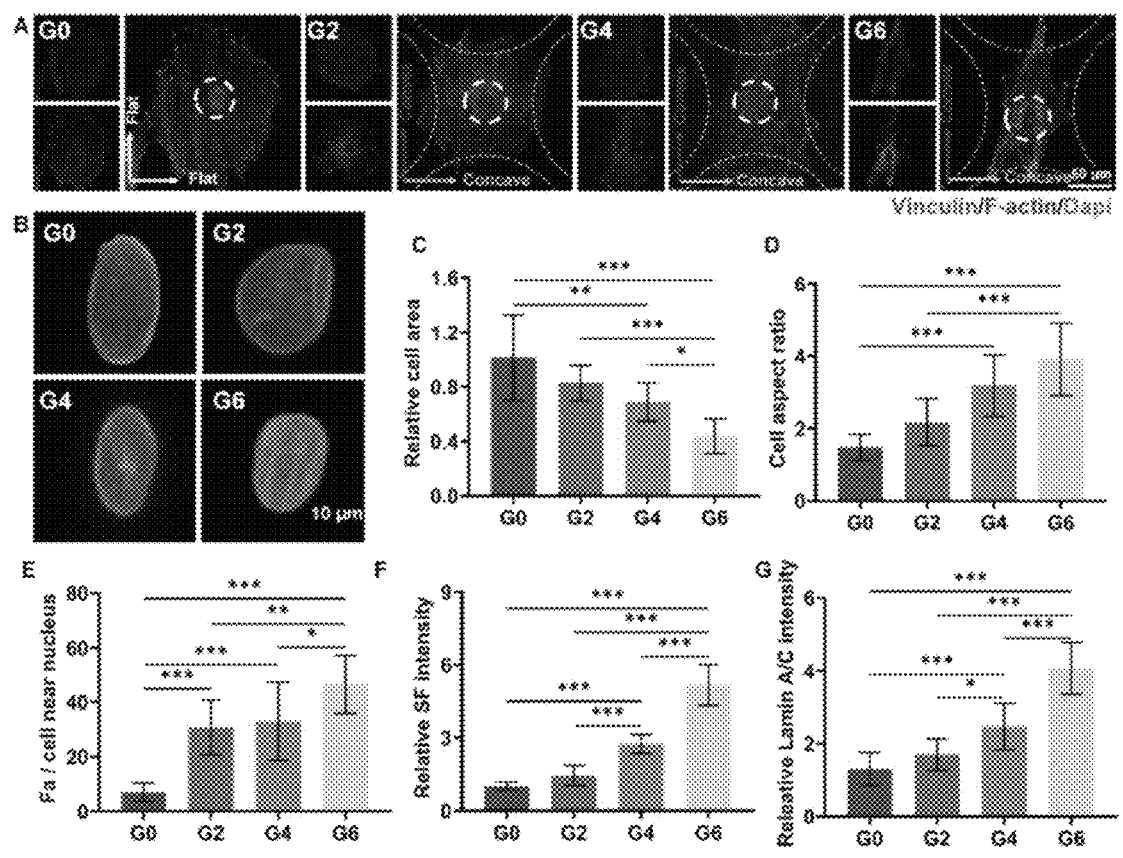
FIG. 10 shows the effect of hyperboloid topology printed in the convex ($K_1>0$) direction on stress fiber (SF), vinculin and Lamin A/C expression in hMSCs: (A) Immunofluorescence staining of vinculin (green), F-actin (red) and nuclei (blue) of hMSCs on hyperboloid surfaces; (B) Immunofluorescence staining of Lamin A/C (green) of hMSCs on hyperboloid surfaces; (C-E) Quantification of cell area, cell aspect ratio and number of focal adhesion (FA) near nuclei; (F-G) Quantification of SF and Lamin A/C (green) intensity of hMSCs on hyperboloid surfaces; Sample size n=10 for all experiments by a one-way ANOVA with a Tukey's post hoc test for multiple comparison. Data are presented as mean±SD. $*p<0.05$, $p<0.01$, and $*p<0.001$ denote the statistical significance.

To validate the robustness of the above results, a series of additional evaluations including the effect of nano-patterns resulting from layer-by-layer 3D printing and the block studies are performed. Firstly, cell orientation along the convex direction is different from the previously reported tendency of hMSCs to orient along the concave direction on torus-shaped surfaces. This could be attributed to the different substrate materials with distinct stiffness (e.g., β-TCP and polydimethylsiloxane). Also, since the nano-patterns resulting from layer-by-layer 3D printing may affect the cell morphology and cell mechanics, the β-TCP hyperboloid surface scaffolds is printed with a perpendicular orientation (i.e., aligning with the convex ($K_1$>0) direction) to exclude possible effects. The SEM and 3D laser microscope scanning analysis confirm the structural integrity of the scaffolds with different printing orientation (FIG. 7B). Afterwards, hMSCs are seeded on these hyperboloid surfaces, where the hMSCs present similar morphology to the elongated orientation in the convex ($K_1$>0) direction which is contrary to the cell morphology in the concave ($K_2$<0) direction (FIG. 10A). This result indicates the cell morphology was irrelevant to the layer-by-layer nano patterns.

With an increase in Gaussian curvature, an increase in the cell aspect ratio and a decrease in the cell area are observed (FIGS. 10C & D). In addition, the effect of the nano-patterns on nucleus mechanics is validated by observing any nuclear morphological change. It is found that the G6 group present more vinculin expression in the vicinity of the cell nucleus and enhanced Lamin A/C expression with shrunken nuclei deformation (FIGS. 10B, E & G). Overall, these results show the consistent cell morphology and nucleus mechanics on β-TCP-based surface hyperboloid structure printed in two perpendicular printing orientations, which could be resulted from the effect of the hyperboloid topology instead of the nano-patterns generated by the 3D printing process.

Figure 11:
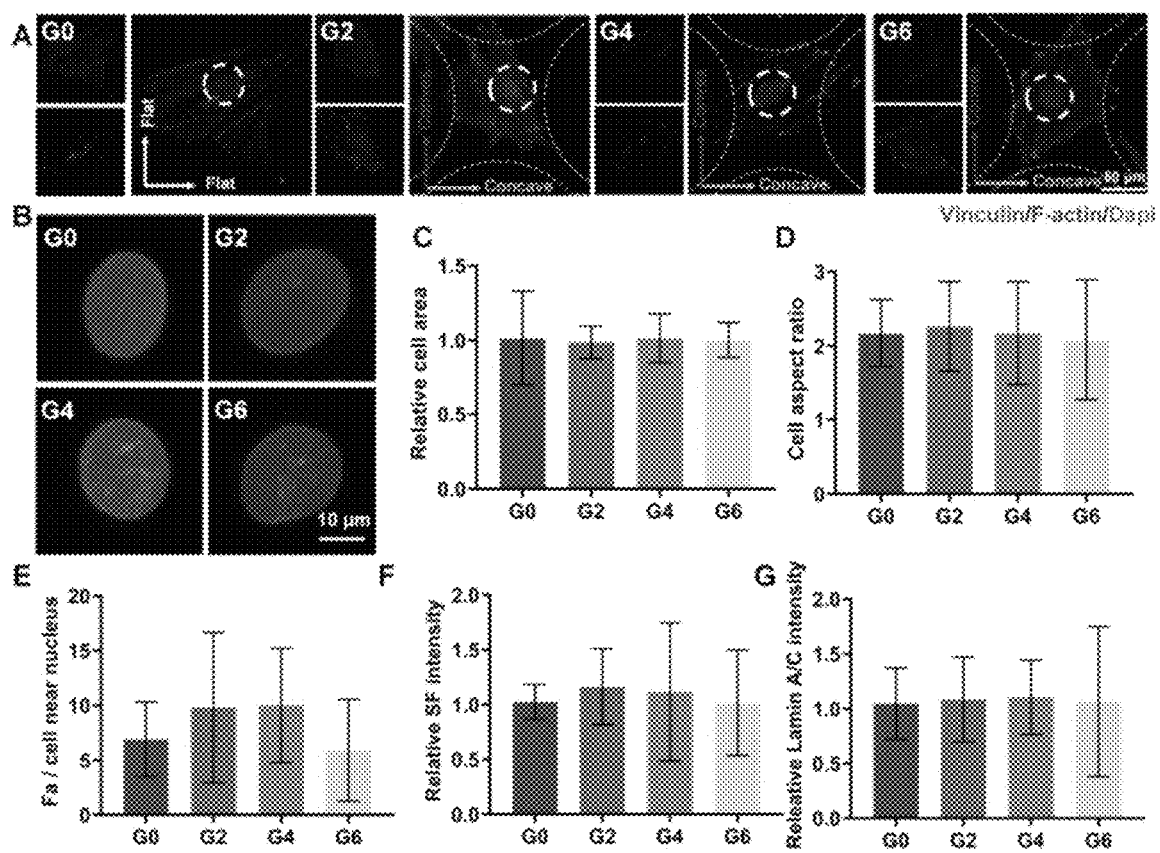
FIG. 11 shows the effect of focal adhesion kinase (FAK) inhibition by PF-573228 on stress fiber (SF), vinculin and Lamin A/C expression. (A) Immunofluorescence staining of vinculin (green), F-actin (red) and nuclei (blue) of hMSCs on hyperboloid surfaces; (B) Immunofluorescence staining of Lamin A/C (green) of hMSCs on hyperboloid surfaces; (C-E) Quantification of cell area, cell aspect ratio and number of focal adhesion (FA) near nuclei; (F-G) quantification of SF and Lamin A/C (green) intensity of hMSCs on hyperboloid surfaces; Sample size n=10 for all experiments by a one-way ANOVA with a Tukey's post hoc test for multiple comparison. Data are presented as mean±SD. $*p<0.05$, $p<0.01$, and $*p<0.001$ denote the statistical significance.

To further validate that such hyperboloid topology (align with the convex ($K_1>0$) printing direction) could induce the cytoskeleton re-organization of hMSCs, impose external forces to the cell nucleus and affect their morphology, the hMSCs are treated with corresponding inhibitors in terms of the FA organization, SF formation and contraction before studying the change in cell morphology. In the cell-ECM interaction, the cells could sense the ECM through the integrin engagement to mediate the FA organization and SF formation and contraction. In this regard, PF-573228 is used to inhibit the focal adhesion kinase (FAK), which plays a critical role in the integrin mediated FA organization. It is found that the hMSCs on the hyperboloid scaffolds treated with PF-573228 present a significant decrease in cell aspect ratio in the convex ($K_1>0$) direction and an increase in cell area (FIGS. 11A, C & D). The formation of the actin filament was drastically disrupted. The vinculin staining for FA evaluation further revealed that the accumulation effect of FA in the vicinity of the cell nucleus induced by the hyperboloid topology had vanished (FIG. S7E). Moreover, no obvious nucleus deformation but with a decrease in Lamin-A/C expression is observed in all groups after PF-573228 treatment (FIGS. 11B & G). These results confirm that the cytoskeleton re-organization on the hyperboloid topology is through integrin mediated FA re-organization to regulate the cell morphology.

Figure 12:
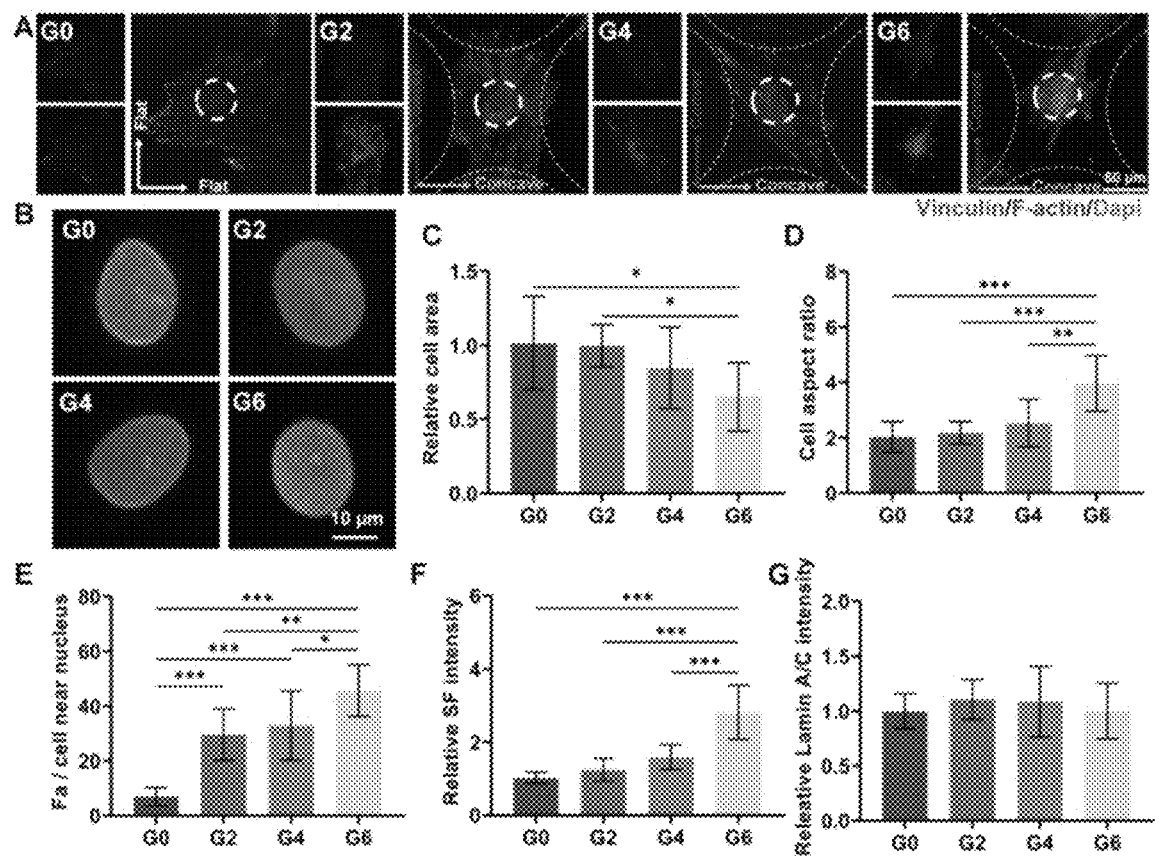
FIG. 12 shows the effect of myosin II inhibition by Blebbistatin on stress fiber (SF), vinculin and Lamin A/C expression. (A) Immunofluorescence staining of vinculin (green), F-actin (red) and nuclei (blue) of hMSCs on hyperboloid surfaces; (B) Immunofluorescence staining of Lamin A/C (green) of hMSCs on hyperboloid surfaces; (C-E) Quantification of cell area, cell aspect ratio and number of focal adhesion (FA) near nuclei; (F-G) quantification of SF and Lamin A/C (green) intensity of hMSCs on hyperboloid surfaces; Sample size n=10 for all experiments by a one-way ANOVA with a Tukey's post hoc test for multiple comparison. Data are presented as mean±SD. $*p<0.05$, $p<0.01$, and $*p<0.001$ denote the statistical significance.

In addition, it is assumed that the downstream SF of the re-organized FA could impose external forces to the cell nucleus. Thus, Blebbistatin is used to inhibit the myosin II expression, which is a motor protein responsible for SF contractility and the force imposed on nucleus. Having treated with a low dose of Blebbistatin for 3 days, it is found that the hMSCs on the hyperboloid scaffolds still demonstrate the elongated morphology with actin filament formation despite the compromised cell aspect ratio and increased cell area (FIGS. 12A, C & D). The FA accumulation is also found in the vicinity of the cell nucleus (FIG. 12E). Interestingly, the nucleus morphology remains unchanged with comparable Lamin-A/C expressions among all groups, indicating that a decrease in SF contractility substantially reduces the force applied to the nucleus (FIGS. 12B and G). Overall, these results verify the inventors' assumption that the hyperboloid topology could induce the FA re-organization as well as SF formation and contraction to modulate cytoskeleton, which can further impose external forces to the cell nucleus, leading to the cell fate regulation.

Figure 13:
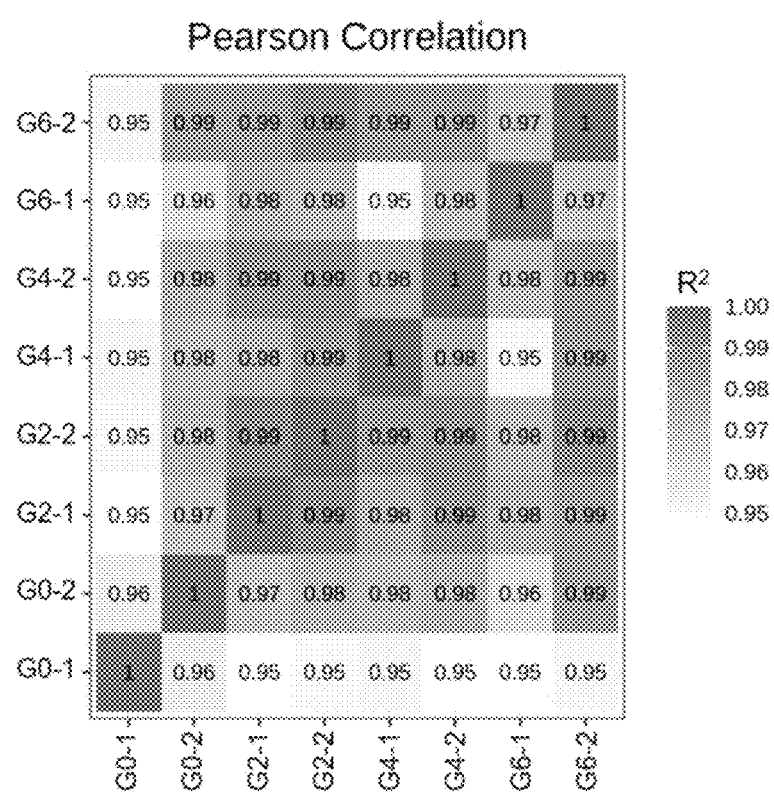
FIG. 13 shows a Pearson correlation evaluation between different samples from different scaffold groups for a transcriptomic analysis.

A transcriptomic analysis of hMSCs cultured on different TPMS scaffolds with different Gaussian curvatures is performed to reveal the underlying mechanisms of how the hyperboloid surfaces affect the osteogenic differentiation and angiogenic paracrine response of hMSCs. FIG. 13 depicts Pearson correlation analysis which reveals that the correlation coefficients of all samples in this analysis are within acceptable range (>0.92), indicating the satisfying sample stability. Then, the differential gene expression (DGE) between the two groups (each of G2, G4 and G6 versus G0) is evaluated by edgeR analysis. Compared with the G0 group, hMSCs cultured on G2, G4 and G6 groups present a wide range of DGEs (e.g., 686 genes for G2 versus G0, 906 genes for G4 versus G0 and 1212 genes for G6 versus G0) with 258 intersecting genes (FIG. 14A). The volcano plots additionally showed 419 up-regulated and 267 down-regulated genes (G2 versus G0), 548 up-regulated and 358 down-regulated genes (G4 versus G0), and 699 up-regulated and 513 down-regulated genes (G6 versus G0) (FIG. 14B-D). These results indicate a Gaussian-curvature-dependent gene expression change in hMSCs. Based on these results, the G6 group is selected for further evaluation as the corresponding samples present the most differentially expressed genes. The DEGs are adopted for Gene Ontology (GO) database evaluation, which include biological process (BP), molecular function (MF) and cellular component (CC). The significantly enriched GO terms ($p<0.05$, G6 versus G0) are collected and some upregulated terms including cell proliferation, cytoskeleton organization and cell adhesion are found to correlate with the cytoskeleton re-organization (FIGS. 15A & B).

Figure 16:
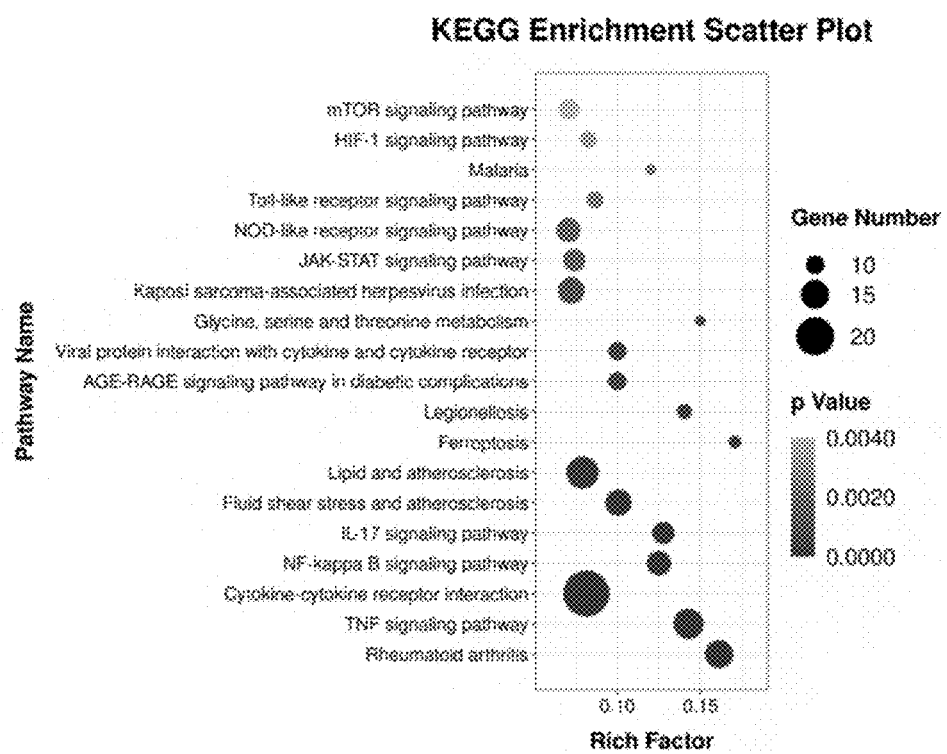
FIG. 16 shows an enlarged view of the plot in FIG. 14(E) for up-regulated enriched KEGG pathways of hMSCs in G6 group versus G0 group.

In addition, the Kyoto Encyclopedia of Genes and Genomes (KEGG) pathway analysis of the DEGs between G6 and G0 is performed (FIG. 14E or 16), which reveals down regulation of certain pro-inflammatory pathways including the tumor necrosis factor (TNF) signaling pathway and Interleukin 17 (IL-17) signaling pathway, as well as up-regulation of ECM-receptor interaction and mitogen-activated protein kinase (MAPK) signaling pathway related to topological modulation. FIG. 14F further shows a heatmap of DEGs in the afore-mentioned pathways demonstrating which series of genes is significantly downregulated (e.g., IL1B, IL6, CSF3) versus the other being upregulated (e.g., ITGA, MAP2K6, ANGPT2) by the proposed hyperboloid topology.

FIG. 14G shows the results of quantitative real-time polymerase chain reaction (qRT-PCR) analysis to validate these gene expression data, where a consistent down-regulated or up-regulated gene expression pattern in two groups (G0 and G6) is obtained. In FIG. 14G, the expressions of ITGA1, ITGB2, PKT2, VCL, MAPK3 and MAPK1 genes in G6 group are significantly higher than those of the G0 group.

Figure 14:
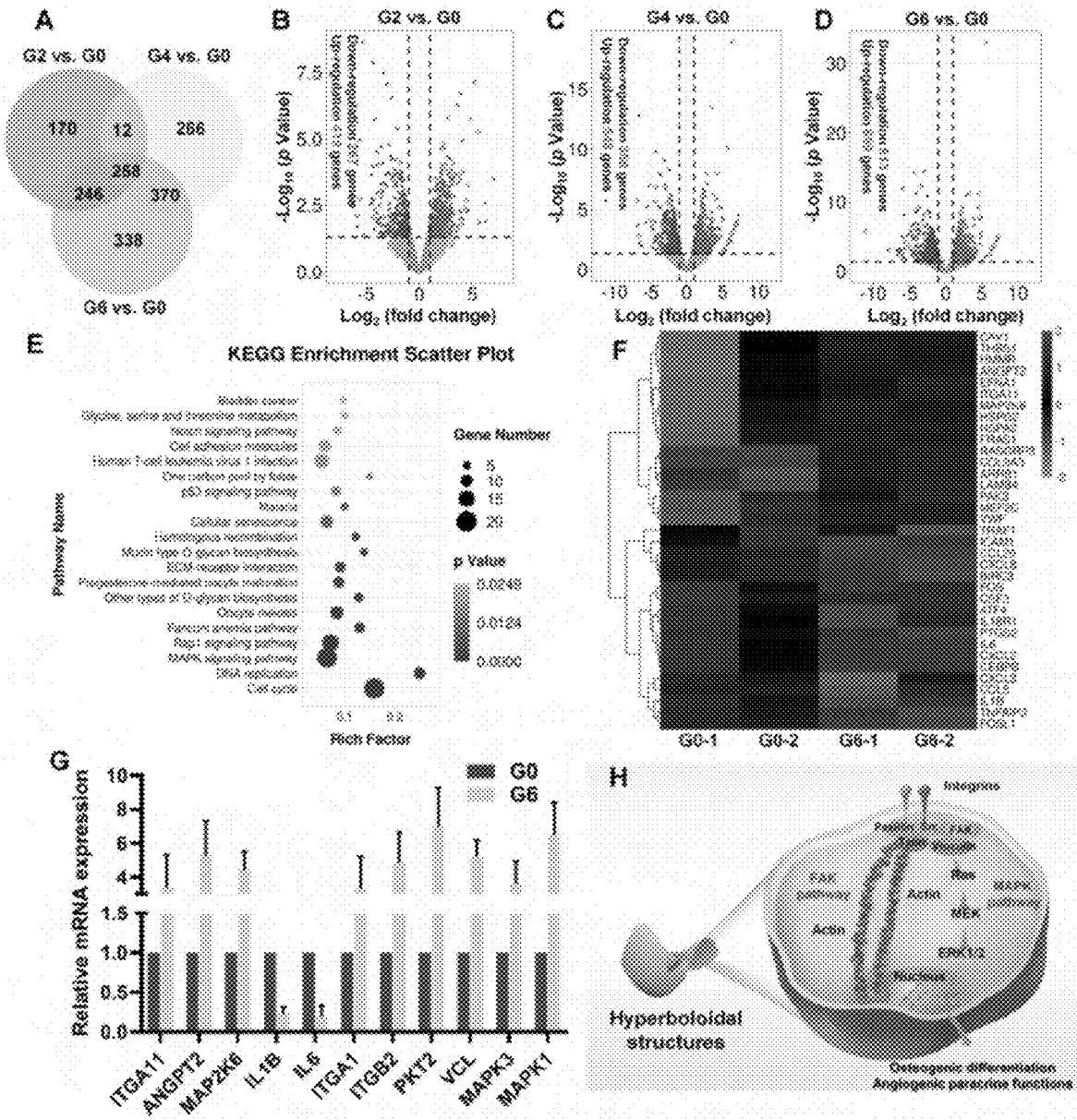
FIG. 14 shows a bioinformatic analysis of gene expression in hMSCs on different TPMS scaffolds: (A) Venn diagram illustration of the differentially expressed genes (DEGs) between the TPMS scaffolds (G2, G4 and G6) and the conventional truss scaffold (G0); Volcano plot of transcriptomic analysis of DEGs in (B) G2 versus G0, (C) G4 versus G0, and (D) G6 versus G0; (E) Up-regulated enriched KEGG pathways of G6 versus G0; (F) Heatmap evaluation of DEGs involved in ECM-receptor interaction, cell adhesion molecule, mitogen-activated protein kinase (MAPK) and pro-inflammatory signaling pathways; (G) Relative mRNA expression evaluation of targeted genes through the qRT-PCR; (H) Schematic illustration of potential integrin-mediated focal adhesion kinase (FAK) and mitogen activated protein kinase (MAPK) pathway activation mechanism of hMSCs' osteogenic differentiation and angiogenic paracrine response on the hyperboloidal structure.
Figure 15:
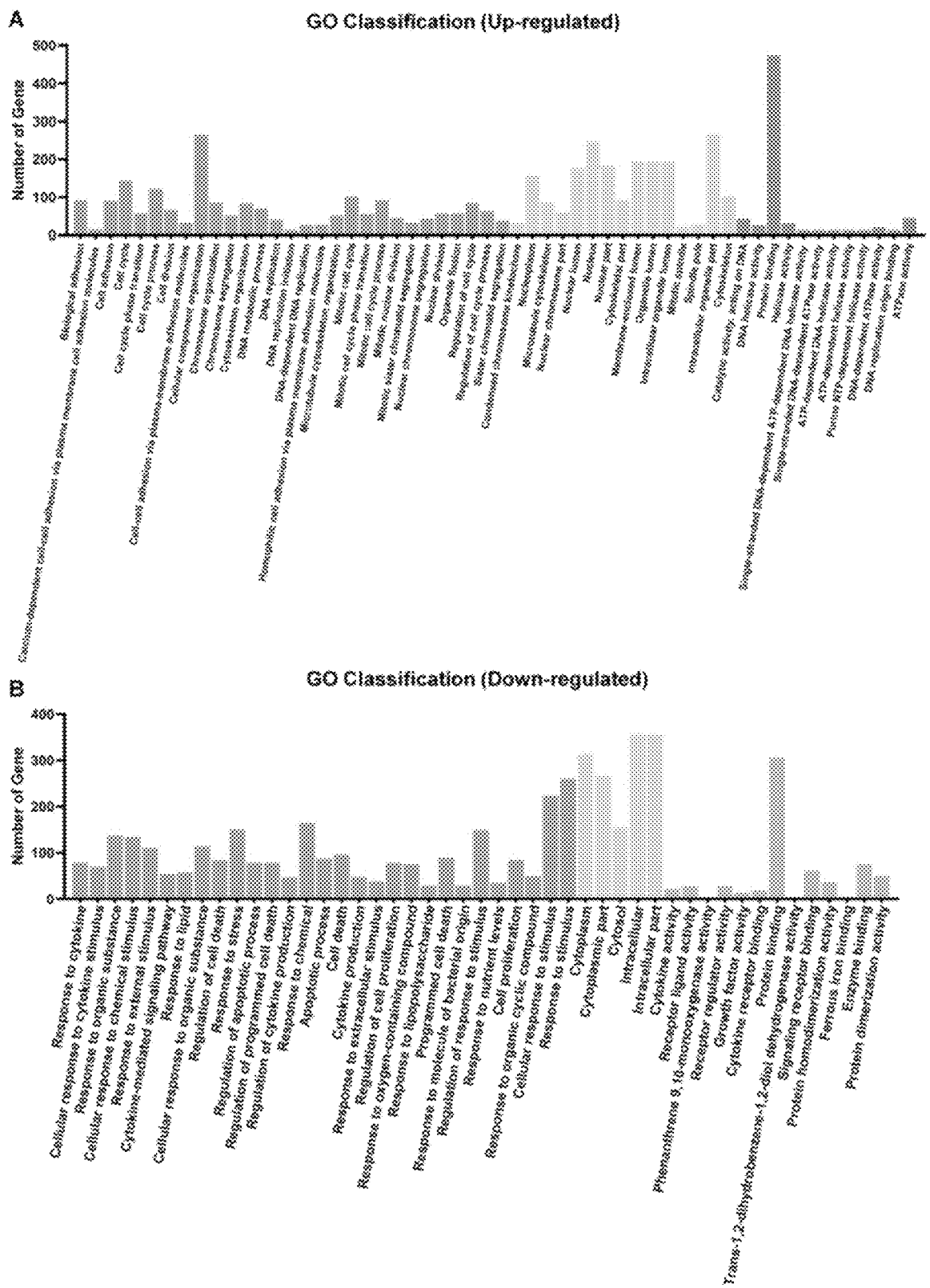
FIG. 15 shows a Gene Ontology (GO) database evaluation in terms of biological process (BP), molecular function (MF) and cellular component (CC) indicated as red, blue, and green bars, respectively for samples from G6 scaffold group compared with those from G0 scaffold group: (A) upregulated genes; (B) downregulated genes.

The results from FIGS. 13-15 collectively indicate a potential integrin mediated FAK and MAPK pathway activation mechanism for the coupled "osteogenesis-angiogenesis". The result of the transcriptomic analysis described herein suggests that the possible activation of MAPK pathway could be attributed to the increased integrin expression and modulated focal adhesion formation. The MAPK pathway has been reported to direct the stem cell differentiation towards osteoblasts. More importantly, the activation of the MAPK pathway is responsible for the angiogenic paracrine effects of hMSCs on the angiogenesis of HUVECs. Therefore, it is assumed that the hyperboloid topology first upregulates the expression of integrin to modulate the FA complex organization (e.g., vinculin). The FA then modulates the SF formation and imposes the mechanical force on the nuclei to activate the FAK pathway, in turn modulate the cell fates (e.g., osteogenesis). Simultaneously, the FA complex activates the downstream Ras and ERK 1/2 in the MAPK pathway (FIG. 14H). Based on this assumption, the proposed activated pathways (i.e., MAPK and FAK pathways) synergistically enhance the osteogenic differentiation and angiogenic paracrine response of hMSCs to achieve the osteogenesis-angiogenesis coupling.

Figure 17:
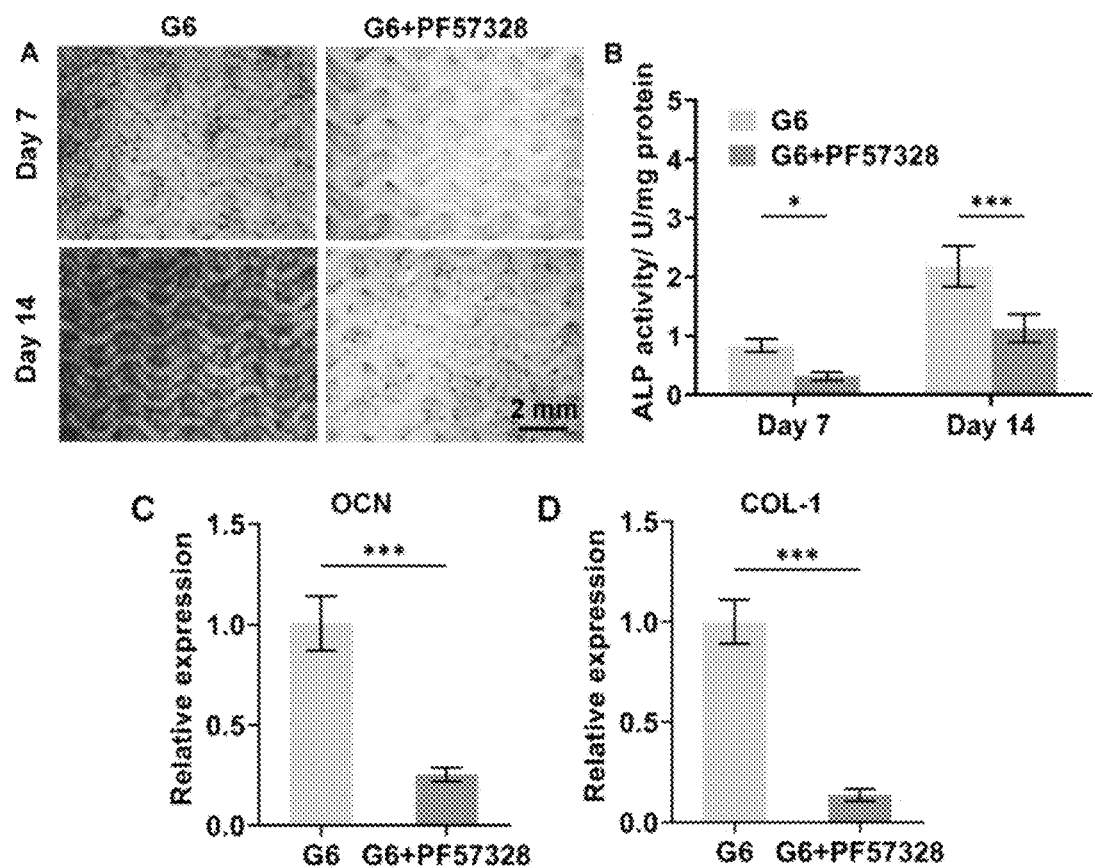
FIG. 17 shows the effect of focal adhesion kinase (FAK) inhibition by PF-573228 in FAK pathway on the osteogenesis of hMSCs on TPMS scaffolds. G6 group was used since it expressed the most differentially genes compared with G0 group. (A and B) ALP staining and ALP activity; (C and D) Relative osteogenic gene expression. Data are presented as mean±SD. $*p<0.05$, $p<0.01$, and $*p<0.001$ denote the statistical significance.
Figure 18:
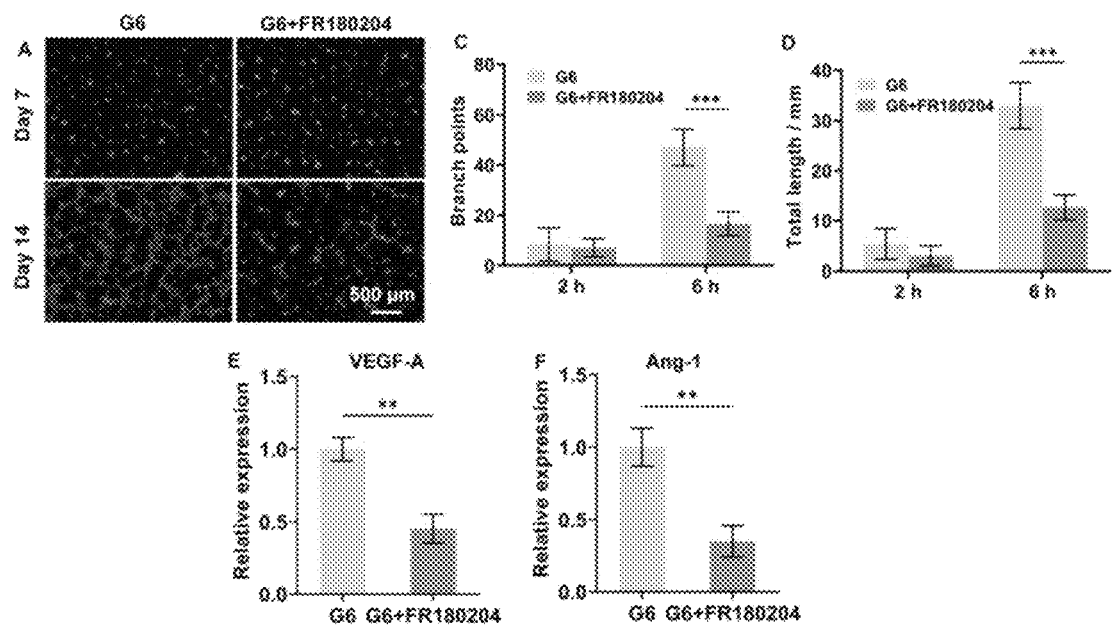
FIG. 18 shows the effect of ERK 1/2 inhibition by FR180204 in MAPK pathway on the angiogenic paracrine response of hMSCs on TPMS scaffolds. G6 group was used since it expressed the most differentially genes compared with G0 group. (A to D) Tube formation assay; (E and F) Relative angiogenic gene expression of HUVECs. Data are presented as mean±SD. $*p<0.05$, $p<0.01$, and $*p<0.001$ denote the statistical significance.

To validate the foregoing assumption, corresponding inhibitors of these pathways are applied to hMSCs of G6 group and those in G0 group to study expression of osteogenesis and angiogenesis markers. In the groups treated with an FAK inhibitor, PF-573228, ALP activity is significantly reduced and the relative osteogenic gene expression (e.g., OCN, COL-1) are significantly suppressed (FIG. 17). In addition, an ERK 1/2 inhibitor, FR180204, for the MAPK pathway substantially decreases the angiogenic paracrine response of hMSCs as demonstrated by the tube formation assay and relative angiogenic gene expression (e.g., VEGF-A, Ang-1) (FIG. 18). Altogether, hMSCs' osteogenic differentiation and angiogenic paracrine response on the proposed hyperboloidal structure appear to attribute to FAK and MAPK pathway activation mechanism mediated by integrin.

Figure 19A:
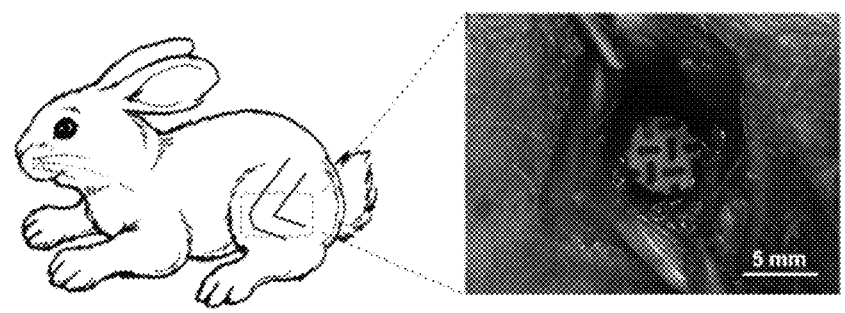
FIG. 19A shows a schematic diagram (left panel) and digital image (right panel) of the present scaffold implantation process during a bone regeneration evaluation in a rabbit femoral defect model according to certain embodiments.
Figure 19B:
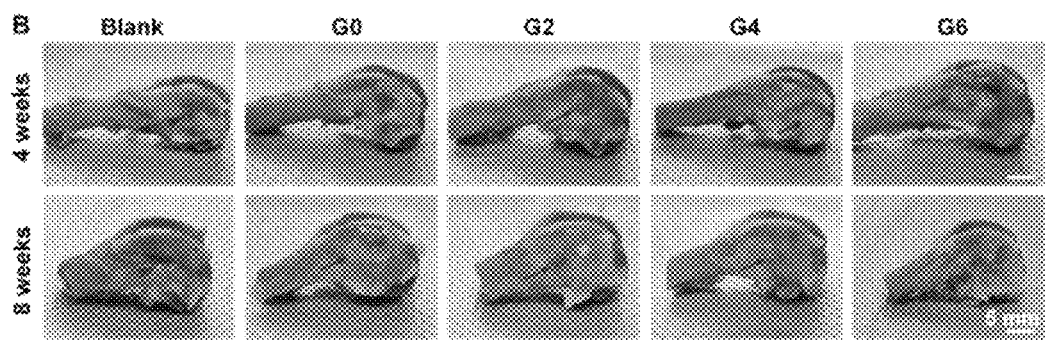
FIG. 19B shows macroscopic images of the femur from the rabbit femoral defect model as depicted in FIG. 19A after implantation with G0 (conventional truss scaffolds), G2, G4 and G6 TPMS scaffolds, and blank (no scaffold) for 4 and 8 weeks, respectively; arrows indicate the bone defect/scaffold area.

FIG. 19A depicts where to implant the proposed scaffolds (G2, G4 and G6) in a rabbit femoral defect model with a blank and conventional truss scaffold with 0 Gaussian curvature (G0) for comparison. After 4 and 8 weeks of implantation, the samples were collected, and all scaffolds were found enveloped in soft tissue without obvious inflammation (FIG. 19B).

Figure 20A:
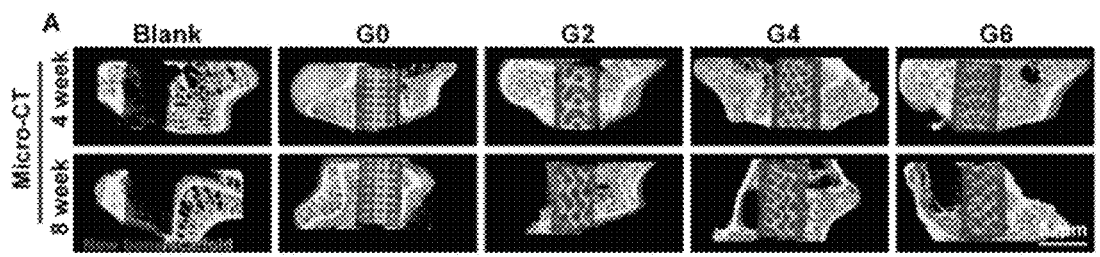
FIG. 20A shows 3D reconstructed images of micro-CT scans at 4 and 8 weeks after the implantation of different scaffolds G0, G2, G4 and G6 in the rabbit femoral defect model according to the implantation process depicted in FIG. 19A; red and green colors denote the new bone tissue and scaffolds, respectively.
Figure 20B:
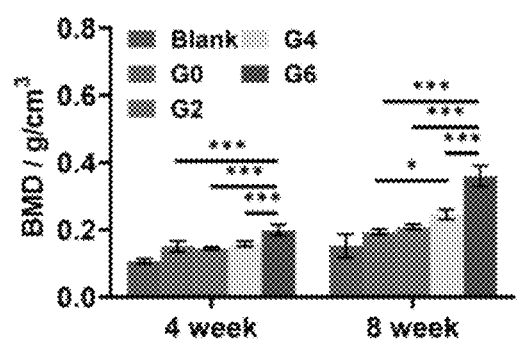
FIG. 20B shows bone mineral density (BMD) obtained 4 weeks and 8 weeks after the implantation of scaffolds G0, G2, G4 and G6 into rabbit femoral defects.
Figure 20C:
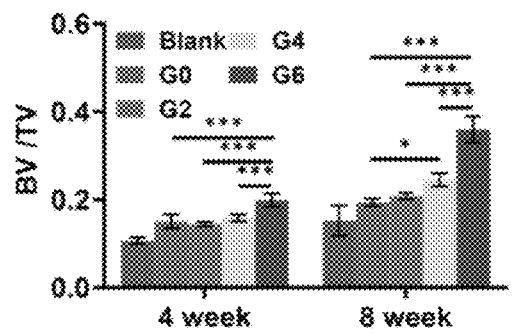
FIG. 20C shows bone volume ratio (BV/TV) obtained 4 weeks and 8 weeks after the implantation of scaffolds G0, G2, G4 and G6 into rabbit femoral defects.

FIGS. 20A to 20C show micro-CT scans and bone quantification results obtained 4 weeks and 8 weeks after the implantation of scaffolds G0, G2, G4 and G6 into rabbit femoral defects according to the implantation scheme depicted in FIG. 19A. FIG. 20A shows the three-dimensional reconstruction of micro-CT scans after implantation of G0, G2, G4 and G6 into the rabbit femoral defects. As shown in FIG. 20A, with an increase in curvature, the new bone (red) within the corresponding scaffolds (green) in the rabbit femoral defect area gradually increases. It is observed that the G2, G4, and G6 groups present more new bone formation than that in G0 group.

FIG. 20B shows the quantified bone density in the implanted area. As shown in the figure, with the increase of curvature, the bone density in the defect area gradually increases. FIG. 20C shows the volume ratio of bone tissue to total tissue in the implanted area. As shown in FIGS. 20B and 20C, with an increase in curvature, the volume ratio of bone tissue to total tissue in the defect area gradually increases. The results reveal that the G6 group presents significantly higher bone mineral density (BMD, $0.201\pm0.021$ g/cm$^3$ and $0.365\pm0.042$ g/cm$^3$) and bone volume/total volume value (BV/TV, $0.103\pm0.017$ and $0.174\pm0.032$) than that of other groups after both 4 and 8 weeks of implantation (*$p<0.05$, $p<0.01$ and *$p<0.001$ indicate statistical significance).

Figure 21A:
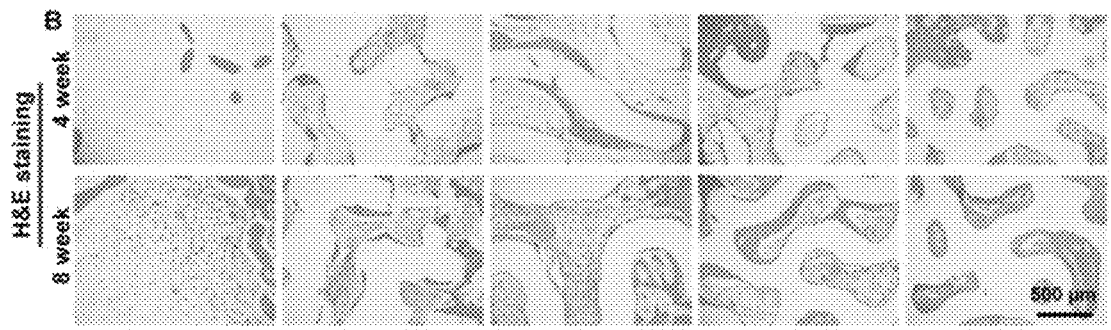
FIG. 21A shows histological staining (H&E) results obtained 4 weeks and 8 weeks after the implantation of scaffolds G0, G2, G4 and G6 into rabbit femoral defects according to the implantation process depicted in FIG. 19A.
Figure 21B:
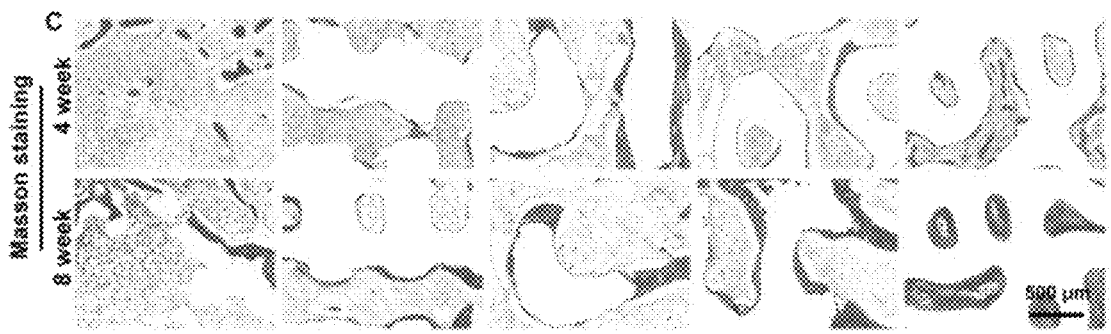
FIG. 21B shows Masson's trichrome staining of the regenerated bone tissue obtained 4 weeks and 8 weeks after the implantation of scaffolds G0, G2, G4 and G6 into rabbit femoral defects according to the implantation process depicted in FIG. 19A.
Figure 21C:
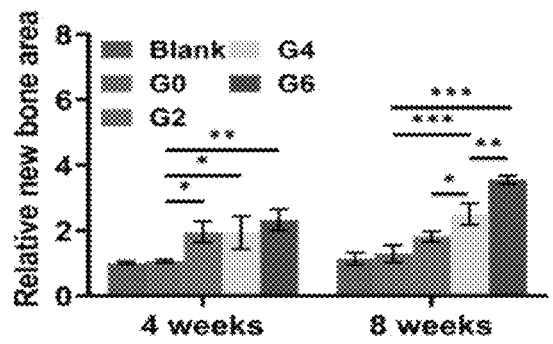
FIG. 21C shows quantification of new bone area in Masson's trichrome staining as shown in FIG. 21B.

FIGS. 21A to 21C show histological staining results, obtained 4 weeks and 8 weeks after the implantation of scaffolds G0, G2, G4 and G6 into rabbit femoral defects according to the implantation scheme depicted in FIG. 19A. FIG. 21A shows the results of H&E staining after implantation of G0, G2, G4 and G6 into the rabbit femoral defects. As shown in FIG. 21A, the implantation of the scaffolds can effectively promote the ingrowth of new tissue, and with an increase in the curvature, the new bone in the rabbit femoral defect area gradually increases. The H&E staining images show that the tissue ingrowth significantly increases in the TPMS groups (G2, G4, and G6) compared to the control group (G0), in which the G6 group presents the highest amount of new bone tissue, suggesting that the TPMS scaffolds with a continuous curved surface could facilitate the neo-tissue infiltration.

FIG. 21B shows the results of Masson's trichrome staining after implantation of G0, G2, G4 and G6 implanted into the rabbit femoral defects. As shown in FIG. 21B, with an increase in the curvature, the new mature bone in the rabbit femoral defect area gradually increases. FIG. 21C shows the quantitative results of the bone tissue area after implantation of G0, G2, G4 and G6 into the rabbit femoral defects. With an increase in the curvature, the area of new bone in the rabbit femoral defect area gradually increases. From the Masson's staining images, the new bone tissue in the G6 group has the highest density among the TPMS groups, and the new bone tissue in G6 group is observed to fill substantially all the space in the corresponding scaffolds after 8 weeks (~3.12 folds compared to G0), suggesting an optimal value and potential in supporting the new bone formation.

The proposed TPMS scaffolds with different Gaussian curvatures are prepared by scaling the unit cell size with consistent porosity. However, it is difficult to achieve a consistent porosity, surface area and pore size in scaffolds with varied Gaussian curvatures. Therefore, apart from the change in Gaussian curvature, there may be some other factors affecting the in vivo efficacy of the proposed scaffolds. For example, it has been reported that pore size relates to bone regeneration via effect on the cell infiltration and adhesion. Small pores could lead to compromised cell infiltration, while overly large pores could decrease the cell adherence. There has been suggested that an optimal range of pore size lies roughly within 200 to 1200 um. In addition, the bone remodeling is typically a layer-by-layer process on the biomaterial surfaces, indicating that bone tissue deposition could benefit from a larger surface area. The increased surface area has also demonstrated higher bone regeneration in several other studies. To this end, the G0 control group with a comparable surface area and pore size to those of the G4 group is used in many characterization tests in the present disclosure to give more insight of the in vivo efficacy of bone regeneration of the TPMS scaffolds. In an in vivo evaluation, it is observed that the G4 group expresses a significantly higher level of bone regeneration compared to that of the G0 group, despite both exhibiting similar porosity and surface area. Moreover, the G6 group presents a significantly higher in vivo efficacy of bone regeneration than that of the G0 group with the same porosity and pore size. As evident by many of the characterization results, with an increase in the Gaussian curvature, the efficacy of bone regeneration is substantially boosted in terms of significant increases in the BMD, BV/TV and new bone formation.

Figure 22:
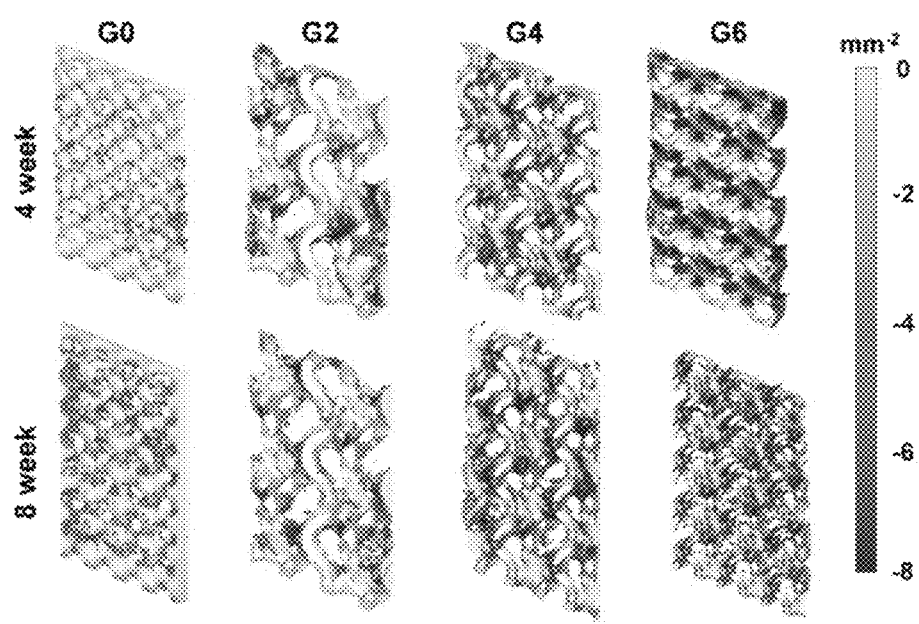
FIG. 22 schematically depicts spatial correlation between the local Gaussian curvature and the new bone formation in each TPMS scaffold: red color indicates new bone formation; blue and yellow colors indicate high Gaussian curvature and low Gaussian curvature regions in each scaffold, respectively.

FIG. 22 further demonstrates a spatial correlation between the local Gaussian curvature on each TPMS surface of the proposed scaffolds and the new bone formation thereon. After overlapping the Gaussian curvature distribution and the new bone formation of each scaffold on 4 and 8 weeks, it is observed that there are more pronounced new bone formations (red) in the regions with high Gaussian curvature (blue) compared to the regions with low Gaussian curvature (yellow) in the same scaffold, indicating a positive correlation between the Gaussian curvature and the bone regeneration.

Figure 23A:
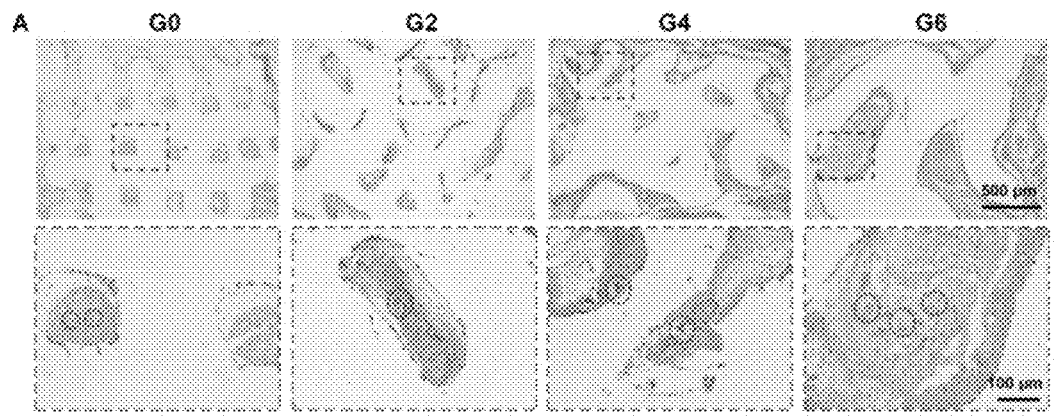
FIG. 23A shows images of H&E histological staining of TPMS scaffolds after 35 days of subcutaneous implantation of scaffolds G0, G2, G4 and G6 in a mouse model according to certain embodiments: blue box indicates the magnification sites; red circle indicates the vessels.
Figure 23B:
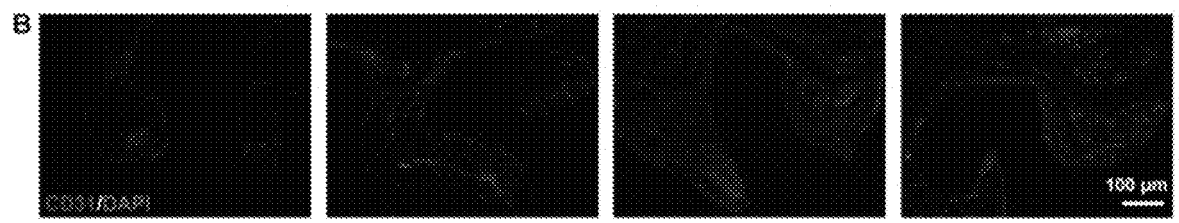
FIG. 23B shows images of CD31 immunohistochemical staining (red) of the neovasculature of the same mouse model implanted with different scaffolds G0, G2, G4 and G6 as in FIG. 23A.
Figure 23C:
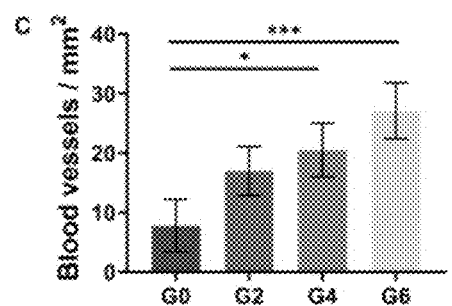
FIG. 23C shows the number of blood vessels from the same mouse model implanted with different scaffolds G0, G2, G4 and G6 as in FIG. 23A. Sample size n=3 for all experiments by a one-way ANOVA with a Tukey's post hoc test for multiple comparison. Data are presented as mean±SD. *p<0.05, p<0.01, and *p<0.001 denote the statistical significance.

To further evaluate the effect of the proposed TPMS scaffolds on angiogenesis, different TPMS scaffolds are subcutaneously implanted in male C57 mice. This animal model has been widely used for neovascularization evaluation of scaffolds. Histological studies on subcutaneous tissue from the animal model indicate that the TPMS groups have more neo-tissue ingrowth with a better integration to the surrounding host tissue after 35 days than the control group. In particular, the G6 group presents the most infiltrated fibrous tissues and neovasculature throughout the scaffolds, indicating their noticeable potential to support the angiogenesis and neovascular infiltration (FIG. 23A). To analyze the number and morphology of the blood vessels, CD31 fluorescence staining (vascular formation marker) is used to label the cells promoting neovasculature and infiltration, and the results indicate that the respective CD31 intensities in the G4 and G6 groups are higher than the rest (i.e., 2.4 and 3.25 folds compared to G0) (FIGS. 23B and 23C). These results suggest that the TPMS scaffolds could promote neovascular formation and infiltration, which are critical to bone regeneration.

In the present disclosure, some examples show that the compressive strength of the scaffolds G2, G4 and G6 is significantly improved to 60 MPa or around compared to that of 40 MPa control G0 with the same porosity. This shows that the minimal surface design of the present invention can effectively reduce stress concentrations and promote load distribution during compression. It should be noted that the compressive strength of the TPMS scaffold is comparable to the mechanical properties of native trabecular bone with the same porosity.

In the present disclosure, some examples show that the scaffolds G0, G2, G4 and G6 have excellent biocompatibility and can effectively promote the osteogenic differentiation of hMSCs and enhance the angiogenic paracrine effect of hMSCs, and the paracrine effect can be further modulated by modulating the Gaussian curvature.

In the present disclosure, some examples show that the scaffolds of the present invention have great potential to support new bone formation. The scaffolds of the present invention can promote the formation and infiltration of new blood vessels, which are essential for complete bone regeneration. The scaffolds can significantly enhance the new bone remodeling in vivo and provide a good prospect for clinical bone defect treatment.

In the present disclosure, other examples show that the scaffolds described herein can well support the survival and proliferation of hMSCs. Furthermore, they can significantly enhance the osteogenic differentiation and angiogenic paracrine of hMSCs in vitro. Due to these unique functions, the scaffolds of the present invention become closer to safe and effective bone repair grafts, and have great potential for clinical translation. It will lay the foundation for the fabrication of programmable osteogenic interfaces as clinical bone grafts.

Certain embodiments provided herein can be applied clinically to commercialization and will benefit patients worldwide with bone defects, including trauma, congenital anomalies, infections (osteomyelitis), and tissue resection due to cancer. Suitable materials (e.g., hyaluronic acid for osteochondral regeneration) will also be applied to a wide range of scaffolds for tissue regeneration (e.g., osteochondral regeneration).

Some specific embodiments describe a TPMS bone structure scaffold made from β-tricalcium phosphate (β-TCP ceramic powder) by 3D printing. However, those of ordinary skill in the art will understand that the present invention is not limited to this, and scaffolds having various structures, shapes and properties can be fabricated from the various materials described hereinbefore by various suitable fabrication methods described herein according to requirements and can be applied to, for example, human tissues and organs such as bone, cartilage, blood vessels, nerves, skin and artificial organs.

The features of the various embodiments of the inventive subject matter described herein, however important to the example embodiments in which they are incorporated, do not generally limit the inventive subject matter, and any reference to the invention, its elements, operation, and applications is not construed as a general limitation, but intended to limit these example embodiments only. Accordingly, this detailed description is not intended to limit the embodiments limited only by the appended claims. Furthermore, since many modifications and changes will readily occur to those skilled in the art, it is not desired to limit the inventive subject matter to the exact construction and operation shown and described, and all suitable modifications and equivalents may be employed within the scope of the inventive subject matter.

The following examples are provided to aid to understand certain embodiments described herein and should not be considered as limiting the scope of the invention.

EXAMPLES (A) Design, Fabrication, and Characterization of TPMS Scaffolds

TPMS exhibit zero mean curvature and non-positive Gaussian curvature at all points. The morphometric analysis of trabecular bone indicated its hyperbolic geometries (negative Gaussian curvature) which is consistent with the geometry of TPMS. Gyroid-type TPMS was adopted in this study, and the sheet Gyroid scaffolds were modelled using the periodic nodal approximation of TPMS with the region of $\phi \leq 0$ representing the solid domain of the scaffolds:

$$\Phi = (\cos(\omega x)\sin(\omega y) + \cos(\omega y)\sin(\omega z) + \cos(\omega z)\sin(\omega x))^2 - c^2$$

where $\omega = 2\pi/L$, and L is the unit cell size. The parameter c controls the porosity of the scaffolds. In this study, the porosity was fixed at 60%, corresponding to $c=0.6164$. Previously, it has been reported that the curvature of a 3D surface scale is linearly with $1/L^2$, as indicated by the dimensional analysis, implying a simple way to tune the curvature of scaffolds by changing the unit cell size. To match the Gaussian curvature (K) of natural trabecular bones, sheet Gyroid scaffolds with the average Gaussian curvature ranging from $-2, -4, -6$ mm$^{-2}$ were designed by varying the cell size (denoted as G2, G4, and G6 respectively). The average principal radii (r) of the scaffolds could be calculated based on the formula $r = \pm\sqrt{-1/K}$. Thus, the three TPMS scaffolds could be described as G2 (K=$-2$ mm$^{-2}$, r=$\pm 0.707$ mm), G4 (K=$-4$ mm$^{-2}$, r=$\pm 0.5$ mm), G6 (K=$-6$ mm$^{-2}$, r=$\pm 0.408$ mm). For each average Gaussian curvature, the specimens were designed as 7×7×2 mm$^3$ cuboids for in vitro experiments and Ø 5 mm×8 mm cylinders for in vivo experiments. All geometric models of sheet Gyroid scaffolds were generated by in-house developed MATLAB scripts, with stereolithography (STL) files as output for 3D printing. Scaffolds with hyperboloid surfaces with the same Gaussian curvature ($-2, -4,$ and $-6$ mm$^{-2}$) at the saddle point were also designed and fabricated to examined the effect of Gaussian curvature on single cell behaviors including cell morphology re-organization, vinculin and Lamin A/C expression.

A commercial β-TCP slurry from Lithoz GmbH containing β-TCP nanoparticles (50 wt. %), 1,6-hexanediol diacrylate based resin (49 wt. %) and photoinitiator (camphorquinone, 1 wt. %) were used to fabricate the designed TPMS scaffolds using the stereolithography-based printer (Lithoz CeraFab 8500, Austria). The layer thickness was set as 25 µm and the exposure time was 15 sec for each layer with 200 mW/cm$^2$ intensity. After the printing process, the cured scaffolds were cleaned with acetone (Sigma-Aldrich, China) followed by the debinding (205° C. with 1° C./min heating rate and 16 h dwell time) and sintering process (1200° C. with 1° C./min heating rate and 4 h dwell time) in ambient air. The micro-CT (Bruker, USA) and SEM (Tescan VEGA3, Czech) was used to characterize the structure and morphology of the printed scaffolds. In addition, a 3D laser microscope (Keyence VK-X200, Japan) was applied to analyze the morphology and curvature of the printed hyperboloidal surface scaffolds (n=3). Compressive test (Instron 5982, USA) was performed to analyze the mechanical properties of the 3D TPMS scaffolds (Ø5 mm×8 mm) with 1 mm/min loading rate until specimen failure according to ASTM C1424 standard. Linear elastic finite element analysis was conducted to study the stress distributions of scaffolds with Abaqus 2019. The unit cells of the sheet Gyroid and truss scaffolds were meshed using linear tetrahedral (C3D4) and linear hexahedral (C3D8R) elements, respectively. The β-TCP ceramic was modelled as a linear elastic material with the Young's modulus of 145 GPa and Poisson's ratio of 0.22. The unit cell models were loaded by a small uniaxial loading under periodic boundary conditions. The von Mises stresses were extracted to evaluate stress concentrations of all scaffolds.

The scaffolds described herein can be used in applications other than a bone scaffold, such as cartilage scaffold, skin scaffold, etc.

(B) Biocompatibility Evaluation

The hMSCs (Cyagen, China, passage 3-5) was used to examine the cytocompatibility of the TPMS scaffolds. The cell culture medium was prepared by a MEM (Gibco, China) supplemented with 10% fetal bovine serum (Gibco, China) and 1% penicillin/streptomycin (Gibco, China). The scaffolds were disinfected with 70% ethyl alcohol solution and washed with phosphate-buffered saline (PBS, Sigma-Aldrich, China). The cytocompatibility of the scaffolds was evaluated by seeding the hMSCs onto the scaffolds. After putting different scaffolds (7×7×2 mm$^3$) in the bottom of a 24 well-plate, 1 mL hMSC suspension ($2\times10^4$ cells/mL) was added onto the scaffolds and pipetted for three times to ensure the cell suspension can permeate into the scaffolds. After 6 h of cell seeding, the well-plates were changed to remove the unattached cells on the TPMS scaffolds. After 1, 3 and 7 days of incubation, the cell viability was assessed by Live/Dead kit (Thermo Fisher, China) according to the manufacturer's protocol. The quantification of cell viability was determined by the ratio of the viable cells to all cells in eight randomly selected images. In addition, the cell number on scaffolds at different time points was evaluated by dissociating the cells with Trypsin-EDTA solution (Thermo Fisher, China) and counted by the hemocytometer (Thermo Fisher, China). The cell density was calculated through normalizing the cell number to the surface area of the scaffolds.

(C) Osteogenic Differentiation of hMSCs on Scaffolds

The osteogenic differentiation of hMSCs on TPMS scaffolds was evaluated by seeding the hMSCs onto the scaffolds by pipetting 1 mL hMSC suspension ($4\times10^4$ cells/mL) on the scaffolds in a 24-well plate. The cells were cultured in osteogenic induced medium (Cyagen, China) containing 0.25 mM ascorbate, 10 mM β-glycerol phosphate, 0.1 μM dexamethasone and 10% FBS in α-MEM. ALP activity of the hMSCs seeded onto different scaffolds was firstly studied. Briefly, after 7 and 14 days of incubation, the cells were fixed by paraformaldehyde (Bioshark, China) for 10 min followed by staining with the BCIP/NBT working solution (Sigma-Aldrich, China). The ALP activity of the hMSCs was quantified by the ALP activity kit (Beyotime, China) with total protein normalization. The ARS staining (Solarbio, China) was used to study the mineralization of the hMSCs. After cell fixation, the ARS staining solution was added to the samples for 20 min. Then, the samples were gently washed by deionized water until the color vanished. All images were taken using optical microscope (Nikon, Japan). Afterwards, the scaffolds were destained with 10% cetylpyridinium chloride (Sigma-Aldrich, China) for 1 h. The extracts were collected and the absorbance at 562 nm was measured by a microplate reader (BioTek, US). The OCN expression of hMSCs cultured on TPMS scaffolds was evaluated. After the cell fixation and permeabilization, the primary antibodies of OCN (Abcam, China) were diluted with PBS (1:200) and incubated with cells overnight at 4° C. Then, the Alexa Fluor-coupled secondary antibody (Abcam, China) was diluted with PBS (1:200) and incubated with cells for 30 min at room temperature. The laser scanning confocal microscope (LCSM, Zeiss, German) was used for OCN immunofluorescence evaluation. qRT-PCR was performed to analyze the osteogenic gene expression (ALP, OCN, Col-1 and RUNX2). Briefly, total RNA was isolated from cells cultured on TPMS scaffolds using TRIzol reagent (Genstar, China). After generating the cDNA by reverse transcription, the qRT-PCR was performed by CFX 96 detection system (Bio-rad, USA).

(D) Angiogenetic Paracrine Effect of hMSCs on HUVECs

To evaluate the angiogenic paracrine effect of hMSCs, the hMSC conditioned medium was firstly prepared. Briefly, 1 mL of hMSC suspension ($4\times10^4$ cells/mL) was pipetted onto TPMS scaffolds in a 24-well plate with the same protocol in cytocompatibility evaluation. The cells were cultured in a medium composed of 50% α-MEM and 50% Endothelial Cell Medium (ScienCell, China). The cells were cultured in a medium composed of 50% α-MEM and 50% Endothelial Cell Medium (ScienCell, China). After 72 h incubation, the culture medium was collected as the hMSC conditioned medium for further evaluation of angiogenesis of HUVECs. The wound healing assay was initially performed according to some established protocol. Briefly, the HUVECs were seeded in six-well plates at a density of $5\times10^4$ cells/cm$^2$. After 24 h incubation, the cell monolayer was scratched with a p200 pipette tip and cultured the cells with the conditioned medium. The cells were stained with crystal violet for the wound healing evaluation after 24 h of incubation. The migration ratio (A) was obtained by the following equation: $A=(A_0-A_1)/A_0\times100\%$, where $A_0$ and $A_1$ denoted the area of initial scratch and final scratch respectively. The tube formation assay was performed according to an established protocol. Briefly, the HUVECs were seeded onto a Matrigel coated 24-well plate at a density of $5\times10^4$ cells/cm$^2$ with the hMSC conditioned medium. After 2 h and 6 h, the HUVECs were stained by Calcein AM (Thermo Fisher, China) and photos were taken by an inverted microscope (Nikon, Japan). The total length and average number of branching points were analyzed by the Image J software (NIH, USA).

(E) Underline Mechanism Elucidation

To give insight of the possible mechanism of osteogenic differentiation and the angiogenic paracrine of hMSCs on TPMS scaffolds, the cell morphology and the cytoskeleton change of hMSCs cultured on hyperbolic surfaces with the same Gaussian curvature of TPMS scaffolds were analyzed. Initially, vinculin, F-actin and Lamin-A/C fluorescent staining was performed according to an established protocol. In brief, after 3 days of incubation, cells seeded on the hyperboloid surfaces were fixed with Block buffer (Bioshark, China) and permeabilized by 0.1% Triton X (Beyotime, China) for 15 min. Afterwards, Lamin-A/C antibody (Abcam, UK), and vinculin antibody (Abcam, UK) were diluted with PBS (1:200) and then incubated with cells at 4° C. overnight. F-actin was stained with Phalloidin 633 (Thermo Fisher, China) and cell nuclei were counterstained with DAPI (Thermo Fisher, China). All images were taken by LCSM and analyzed by image J software.

(F) In Vivo Therapeutic Efficacy of Bone Regeneration

The rabbit femoral defect model was used to assess the therapeutic efficacy of bone regeneration of the TPMS scaffolds. 60 New Zealand white rabbits (male, 2.5-3 kg) were adopted and randomly divided into five groups (blank, G0, G2, G4 and G6, n=6 per group for each time point). This is because the acceptable range of degree of freedom (DF) was between 10 and 20 and n=6 could satisfy the power analysis. The rabbits were anesthetized with pentobarbital sodium and created a 6-cm skin incision to expose the femoral condyle. Next, a dental drill was used to create a 5-mm diameter round defect on the exposed femoral condyle. The TPMS scaffolds (Ø5 mm×8 mm) were then implanted into the defect region and the defect sites of the rabbits were sutured. After 4 and 8-week post-implantation, the rabbits were sacrificed (n=6 per group) with $CO_2$ suffocation and harvested the femur samples. The high-resolution micro-CT (SkyScan 1176, Belgium) was used to analyze the bone regeneration using the scaffolds. The scanning parameters were set as source voltage 80 kV, source current 124 µA, 0.5 mm Al filter and rotation step of 0.6°. The different thresholding ranges (threshold for new bone=80~140, scaffold=140) were applied to distinguish the new bone and the scaffold. 3D models were reconstructed by the NRecon software (Bruker, Belgium). Quantification results of the BMD and BV/TV were calculated by CTAn software (Bruker, Belgium). The reconstructed models of the new bones were further aligned with the as-designed TPMS scaffolds using the open-source mesh processing software Meshlab. To correlate the spatial distributions of new bone formations and the local curvatures of scaffolds, the Gaussian curvatures of TPMS scaffolds were calculated based on the implicit representation of TPMS scaffolds. For visualization, a slice of the scaffold rendered by its Gaussian curvature was plotted and the aligned new bones were overlapped on the scaffolds using Matlab scripting. After the micro-CT analysis, the histology analysis was further performed. H&E staining and Masson's trichrome staining were performed to observe the formation of new bone tissues in the defect sites.

Meanwhile, the mouse subcutaneous implantation model was applied to validate the effect of TPMS scaffolds on neovascularization. Briefly, 30 male BALB/c mice were randomly divided into five groups (blank, G0, G2, G4 and G6) and anesthetized by inhalational isoflurane. A subcutaneous incision (6 mm) was then created on the back of the mice with two Ø 5 mm×8 mm cylindrical scaffolds inserted under the skin and pushed to both sides of the incision. The mice were sacrificed at 35 days post-implantation. After removing the surrounding tissues, the samples were prepared for paraffin section, followed by the H&E staining and CD31 immunofluorescence staining for evaluation of neovascularization. The sections were analyzed using fluorescence microscopy and the fluorescence intensity was assessed by Image J software.

What is claimed is:

1. A scaffold comprising a plurality of pores, wherein each of the plurality of pores has a hyperboloid structure, any point on a surface of each of the plurality of pores has the hyperboloid structure, the hyperboloid structure is a gyroid-type triply periodic minimal surface structure, and the scaffold has a Gaussian curvature of mm$^{-2}$ to −6 mm$^{-2}$.

2. The scaffold of claim 1, wherein the scaffold has a porosity of 20% to 90%.

3. The scaffold of claim 1, wherein each of the plurality of pores connects with each other.

4. The scaffold of claim 1 being made from a ceramic material, a metal material, or a polymer.

5. The scaffold of claim 4, wherein the ceramic material comprises β-tricalcium phosphate.

6. The scaffold of claim 4, wherein the metal material comprises a titanium alloy or a magnesium alloy.

7. The scaffold of claim 4, wherein the polymer comprises polymethyl methacrylate, gelatin methacrylate anhydride or polyether ether ketone.

8. The scaffold according to claim 1, further comprising one or more biologically active metal ions.

9. The scaffold according to claim 8, wherein the one or more metal ions are one or more ions selected from $Zn^{2+}$, $Cu^{2+}$, $Mg^{2+}$, $Sr^{2+}$, $Mn^{2+}$, $Al^{3+}$, $Co^{2+}$, $Fe^{2+}$, $Ag^+$, and $Li^+$.

10. The scaffold according to claim 1, further comprising an internal surface area composed of the surfaces of the plurality of pores which is surface treated.

11. The scaffold according to claim 10, wherein the internal surface area is incorporated with a bioactive molecule generating and releasing film.

12. The scaffold according to claim 1 being a biocompatible scaffold.

* * * * *